United States Patent [19]
Fernandez

[11] Patent Number: 5,833,567
[45] Date of Patent: Nov. 10, 1998

[54] INERTIAL POWER TRANSMISSION

[76] Inventor: Angel Fernandez, 45670 White Oak Dr., Shelby Township, Mich. 48315

[21] Appl. No.: 824,280

[22] Filed: Mar. 26, 1997

[51] Int. Cl.$^6$ ....................................................... F16H 3/74
[52] U.S. Cl. .............................................. 475/255; 192/45
[58] Field of Search ..................... 475/162, 255, 475/331, 338, 341, 343, 267, 16, 31; 74/84 S, 84 R, 393, 394, 125.5, 410; 192/45, 93 R, 70.23

[56] References Cited

U.S. PATENT DOCUMENTS

| | | |
|---|---|---|
| 1,654,790 | 1/1928 | Coleman .............................. 475/255 X |
| 1,812,176 | 5/1931 | Sheridan . |
| 1,860,383 | 8/1932 | Chalmers . |
| 1,988,405 | 2/1935 | Walton ..................................... 475/255 |
| 2,077,556 | 5/1937 | Gaston . |
| 2,149,560 | 3/1939 | Teece et al. . |
| 2,476,245 | 7/1949 | Lewis . |
| 2,564,211 | 8/1951 | O'Hara .................................... 475/255 |
| 2,881,642 | 4/1959 | Dodge . |
| 2,981,125 | 4/1961 | Dodge ............................... 475/255 X |
| 2,984,124 | 5/1961 | Keyser ..................................... 475/255 |
| 3,728,911 | 4/1973 | Granville . |
| 3,960,036 | 6/1976 | Moller . |
| 4,121,696 | 10/1978 | Margetts ............................. 192/70.23 |
| 4,579,204 | 4/1986 | Iio ......................................... 192/93 R |
| 4,889,013 | 12/1989 | Pitassi et al. . |
| 5,134,894 | 8/1992 | Tam . |

Primary Examiner—Rodney H. Bonck
Assistant Examiner—Marcus Charles
Attorney, Agent, or Firm—Brooks & Kushman P. C.

[57] ABSTRACT

A ring gear and a plurality of planet gear carriers diametrically disposed, at substantially equal angles to each other, in a plane therewithin, each carrier rotatably supporting a separate one of a pair of planet gears at each opposite end thereof. The planet gears engage with and are rotated by the ring gear. Each planet gear has an eccentrically disposed mass that revolves about the center of rotation of the planet gear while revolving about the center of rotation of the planet gear carrier, creating centrifugal and Coriolis forces that are additive. An instant angular disposition, with respect to its planet gear carrier, of the center of mass of one of a pair of planet gears is always the same as that of the other of the pair but does not coincide with that of any other planet gear. This creates a couple that is applied to an output shaft when the force of the former and the rotation of the latter are in the same direction. When they are not, the couple is applied to a reaction plate. The angular disposition between the planet gear carriers ensure that torque pulses applied to the output shaft by the couples are not applied simultaneously but are equally separated in time to provide a relatively smooth output torque.

11 Claims, 12 Drawing Sheets

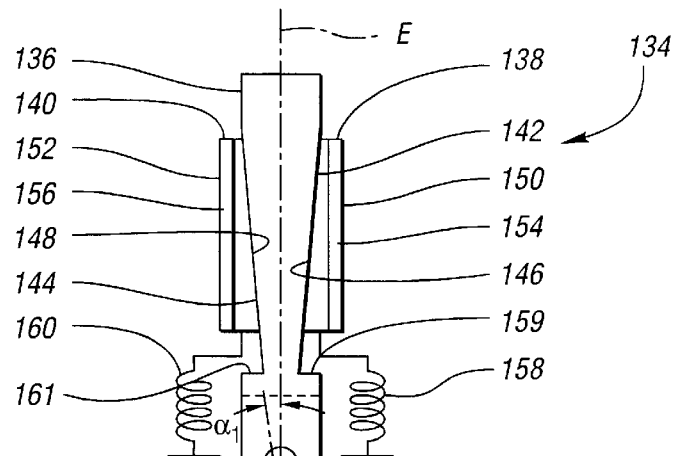
Fig. 5
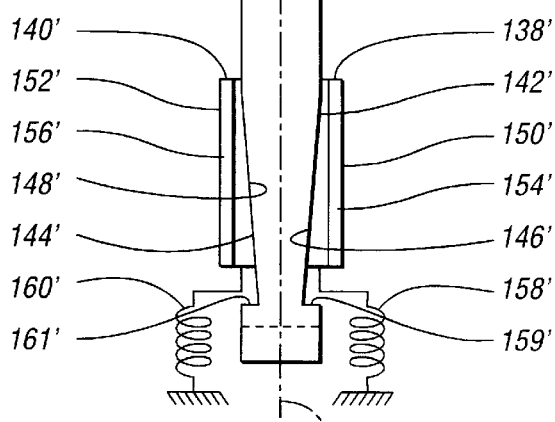
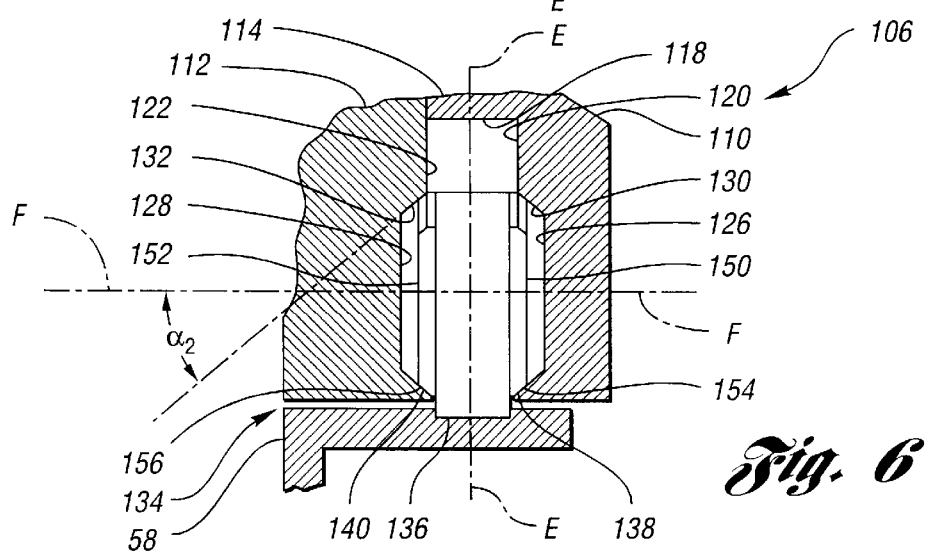
Fig. 6

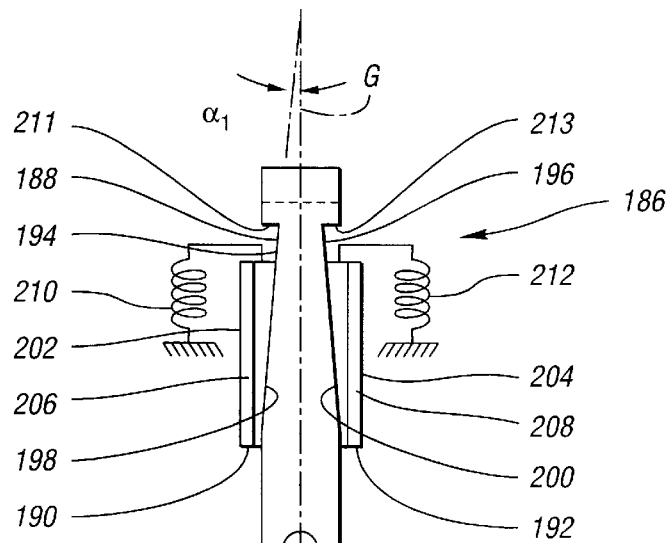
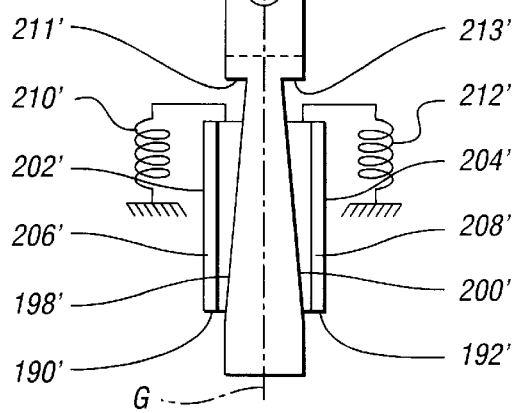
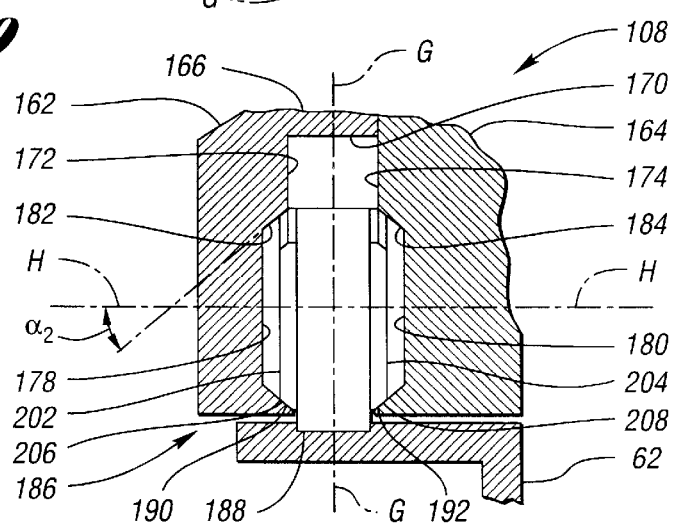

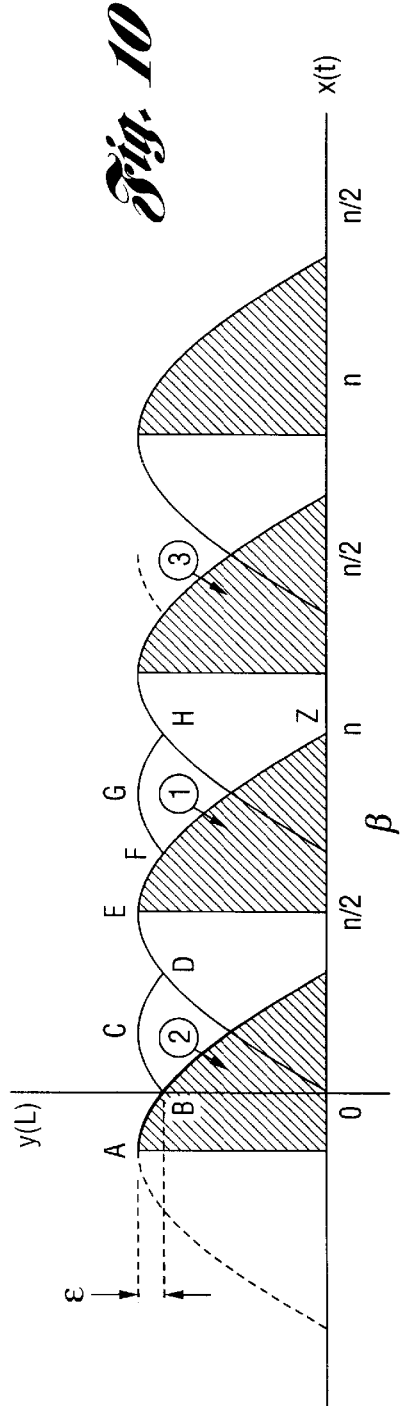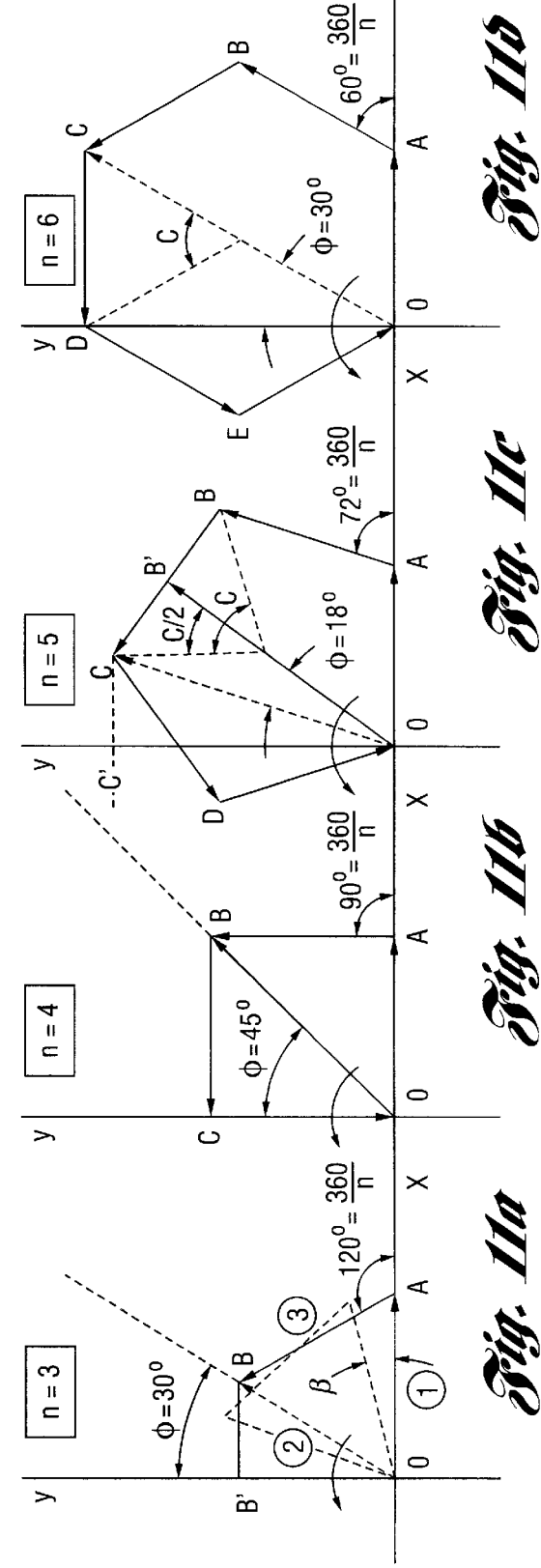

INERTIAL POWER TRANSMISSION

TECHNICAL FIELD

This invention relates generally to mechanical power transmission devices that deliver torque pulses and more specifically to those devices that use eccentrically weighted planet gears.

BACKGROUND ART

A central gear driving a plurality of peripherally disposed pinion gears that have eccentrically disposed masses have been known for some time. For example, U.S. Pat. No. 1,860,383, issued on May 31, 1932 to Chalmers, discloses a torque mechanism including a central sun gear rotated by a driving shaft having an axis of rotation along a central axis of the torque mechanism. Each of a plurality of pinion, or planet, gears rotatably mounted on a supporting frame concentrically about the central axis is rotated by the sun gear.

Each of the planet gears has a mass extending beyond its toothed periphery to distance the center of mass of the planet gear from its axis of rotation. As each planet gear is rotated, its center of mass revolves about its axis of rotation; and the inertia of each revolving mass imparts an impulse to the supporting frame, tending to drive the frame in one direction during one half of the planet gear rotation and in the opposite direction during the other half of the planet gear rotation. A clutch mechanism using clutch rollers communicates impulses one direction to a driver shaft and allows the driver shaft to continue rotating independently when the impulses are in the opposite direction.

The mutual angular disposition of each of the planet gears about the central axis is fixed by the fact that the planet gears are mounted on a supporting frame. The one-way clutches are standard roller clutches, which require a full complement of rollers completely surrounding the central axis. The centers of mass of all the planet gears are aligned with, and radially outward of, their respective centers of rotation and the central axis of the mechanism at the same time, which results in the impulses applied by each to the supporting frame being in phase.

While the prior techniques function with a certain degree of efficiency, none disclose the advantages of the improved inertial power transmission of the present invention as is hereinafter more fully described.

DISCLOSURE OF THE INVENTION

An object of the present invention is to provide an improved apparatus and method for producing a smoothly pulsed torque output while transmitting mechanical power.

Another object is to provide an apparatus having clutches that require few components and that do not extend completely about the central axis.

Still another object is to provide an apparatus having planet gears the mutual angular disposition of each of which, with respect to a central axis of revolution, is allowed to vary within a limited range.

A feature of the present invention is the use of polyphased rotating eccentric masses to provide an overlapping series of inertial pulses to enhance torque output.

Another feature is the use of a ring gear and a plurality of planet gear carriers diametrically disposed therewithin, each carrier rotatably supporting a separate one of a pair of planet gears at each opposite end thereof for cooperation with the ring gear.

Still another feature is the use of a combination of wedges cooperating to form clutches to control the rotation of the planet gear carriers and of a forward drive disk.

An advantage of the present invention is that the production of a smoothly pulsed torque output results in less stress being applied to associated transmission components.

Another advantage of the present invention is that fewer required clutch components results in a reduction of weight, assembly effort and expense.

An advantage of the present invention is that the use of a ring gear, rather than a sun gear, plane thereabout and about the central axis. One of a plurality of planet gear shafts is mounted proximate a separate end of each of the plurality of planet gear carriers. Each planet gear shaft has a longitudinal axis of rotation mutually parallel to and spaced from the central axis.

One of a plurality of planet gears is mounted on each of the planet gear shafts for rotation thereabout and for engagement with the ring gear. The mass of each of the two planet gears supported by any planet gear carrier is eccentrically distributed so that the rotational moment of each of the two planet gears is equal and opposite to that of the other. A stationary ring assembly is affixed to the stationary member and has an axis of symmetry coincident with the central axis. A drive ring assembly is affixed to the forward drive member for rotation therewith about the central axis.

A stationary ring clutch is disposed in cooperation with each end of each of the planet gear carriers and the stationary ring assembly to allow the former to rotate relative to the latter in only a first direction. A drive ring clutch is disposed in cooperation with the drive ring assembly and each end of each of the planet gear carriers to allow the former to rotate relative to the latter in only the same first direction.

The objects, features and advantages of the present invention are readily apparent from the following detailed description of the best mode for carrying out the invention when taken in connection to receive the drive of an input shaft allows centrifugal and Coriolis forces developed by the eccentric masses to be added and allows planet gear carriers a limited amount of mutual angular freedom.

In realizing the aforementioned and other objects, the inertial power transmission apparatus of the present invention includes a stationary support. An input shaft is rotatably mounted on the stationary support, and it has a longitudinal axis of rotation coincident with a central axis. An output shaft is also rotatably mounted on the stationary support and has a longitudinal axis of rotation aligned with that of the input shaft and the central axis.

An input member is disposed in a plane perpendicular to the central axis and is centrally affixed to the input shaft for rotation with the input shaft about the central axis. A ring gear having a plane parallel to and spaced from that of the input member is affixed thereto for rotation therewith about the central axis. A stationary member is disposed in a plane parallel to and spaced from that of the input member and is affixed to the stationary support. A forward drive member is disposed in a plane parallel to and spaced from that of the input member and is centrally affixed to the output shaft for rotation therewith about the central axis.

A plurality of planet gear carriers, each extending diametrically along a plane parallel to and preferably within the ring gear, are centrally mounted on the output shaft for rotation in a carrier with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein:

FIG. 5 is a plan view of one of two one-way clutches of the present invention;

FIG. 6 is an end view of the clutch of FIG. 5 shown mounted in a portion, shown in section, of the present invention;

FIG. 8 is a plan view of the other of the two one-way clutches of the present invention;

FIG. 9 is an end view of the clutch of FIG. 8 shown mounted in a portion, shown in section, of the present invention;

FIG. 10 is a graph illustrating the relative phases of output torque pulses;

FIG. 11A is a graphic representation of torque vectors in an inertial power transmission having three planet gear carriers;

FIG. 11B is a graphic representation of torque vectors in an inertial power transmission having four planet gear carriers;

FIG. 11C is a graphic representation of torque vectors in an inertial power transmission having five planet gear carriers;

FIG. 11D is a graphic representation of torque vectors in an inertial power transmission having six planet gear carriers;

BEST MODE FOR CARRYING OUT THE INVENTION

Figure 1:
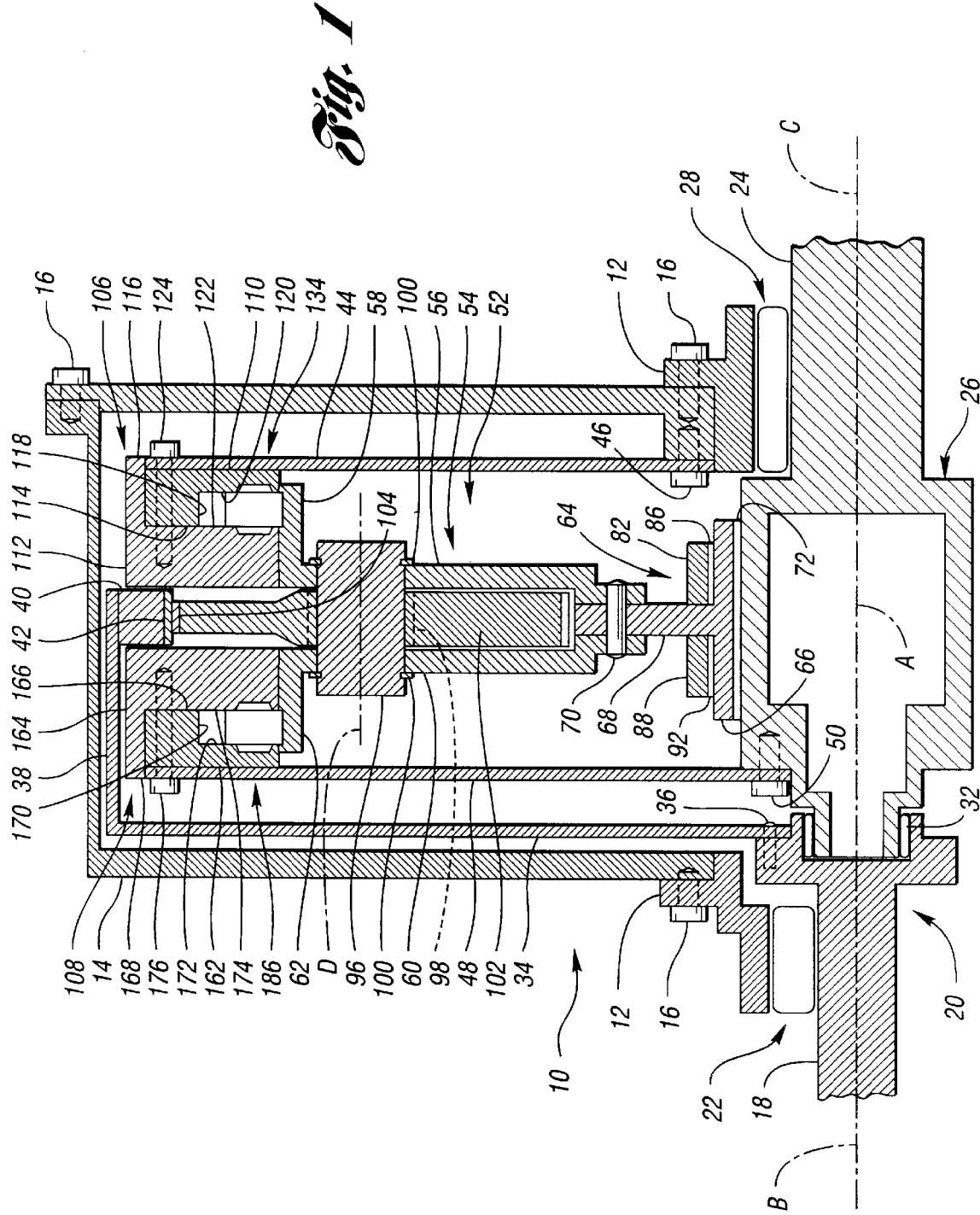
FIG. 1 is a lateral view, partly in section, of a first preferred embodiment of the present invention that provides torque output in a single direction.

With reference to FIG. 1, a first preferred embodiment of an inertial power transmission apparatus, generally indicated by reference numeral 10, includes a stationary support 12, having a central axis A, and a housing 14 affixed thereto with, for example, bolts 16, or their equivalent. An input shaft 18, having a radially enlarged terminal portion, generally indicated by reference numeral 20, is rotatably mounted, with bearings, generally indicated by reference numeral 22, on the stationary support 12. The input shaft 18 has a longitudinal axis of rotation B aligned with the central axis A.

An output shaft 24, having a radially enlarged terminal portion, generally indicated by reference numeral 26, is also rotatably mounted, with bearings, generally indicated by reference numeral 28, on the stationary support 12. The terminal portion 26 of the output shaft 24 has an extended portion, generally indicated by reference numeral 30, that rotates within a recess in the terminal portion 20 of the input shaft 18, an intershaft bearing 32 being disposed therebetween. The output shaft 24 has a longitudinal axis C of rotation aligned with that of the input shaft 18 and the central axis A.

An input member, or disk, 34 is disposed in a plane perpendicular to the central axis A and is centrally affixed to the input shaft 18 with first coupling means, which, in the first preferred embodiment, for example, are bolts 36, or their equivalent, for rotation therewith about the central axis A. The input disk 34 has a peripheral flange 38 extending at right angles therefrom, the flange 38 being formed integrally with the input disk 34 or affixed thereto with any of a number of well-known means. A ring gear 40, having radially inwardly projecting gear teeth 42, and having a plane parallel to and spaced from that of the input disk 34, is affixed to, or integrally formed with, the input disk peripheral flange 38 for rotation therewith about the central axis A.

A stationary member, or disk, 44 is disposed in a plane parallel to and spaced from that of the input disk 34 and is affixed to the stationary support 12 with second coupling means, which, in the first preferred embodiment, for example, are bolts 46, or their equivalent. The stationary disk 44 is a "reaction" member, which provides a reaction point which is necessary for the inertial power transmission of the present invention to achieve torque "multiplication." A forward drive member, or disk, 48 is disposed in a plane parallel to and spaced from that of the input disk 34 and is centrally affixed to the output shaft 24, with third coupling means, which, in the first preferred embodiment, for example, are bolts 50, or their equivalent, for rotation therewith about the central axis A.

In the first preferred embodiment of the invention, there are three planet gear carriers. A first planet gear carrier, generally indicated by reference numeral 52, extends diametrically along the plane of, and within, the ring gear 40. Second and third gear carriers 74 and 76 (FIG. 2) also extend diametrically along the plane of, and within, the ring gear 40. The latter gear carriers 74 and 76 are disposed at substantially equal mutual angles to each other and to the first planet gear carrier 52. All three gear carriers 52, 74 and 76 rotate about the central axis A. It should be understood that a greater or lesser number of gear carriers may be used, each number, of course, being attended by respective advantages and disadvantages.

The first planet gear carrier 52 includes a pair of peripheral assemblies, generally indicated by reference numeral 54. (Only one of the pair of peripheral assemblies 54 is shown in FIG. 1.) Each of the pair of peripheral assemblies 54 includes a first peripheral assembly portion 56 having a flange 58 extending at right angles therefrom. Each of the pair of peripheral assemblies 54 also includes a second peripheral assembly portion 60 having a flange 62 extending at right angles therefrom. Since the peripheral assemblies 54 for the second and third gear carriers 74 and 76 are the same as those for the first planet gear carrier 52, the detailed description of the first planet gear carrier 52 applies to them as well.

Figure 4:
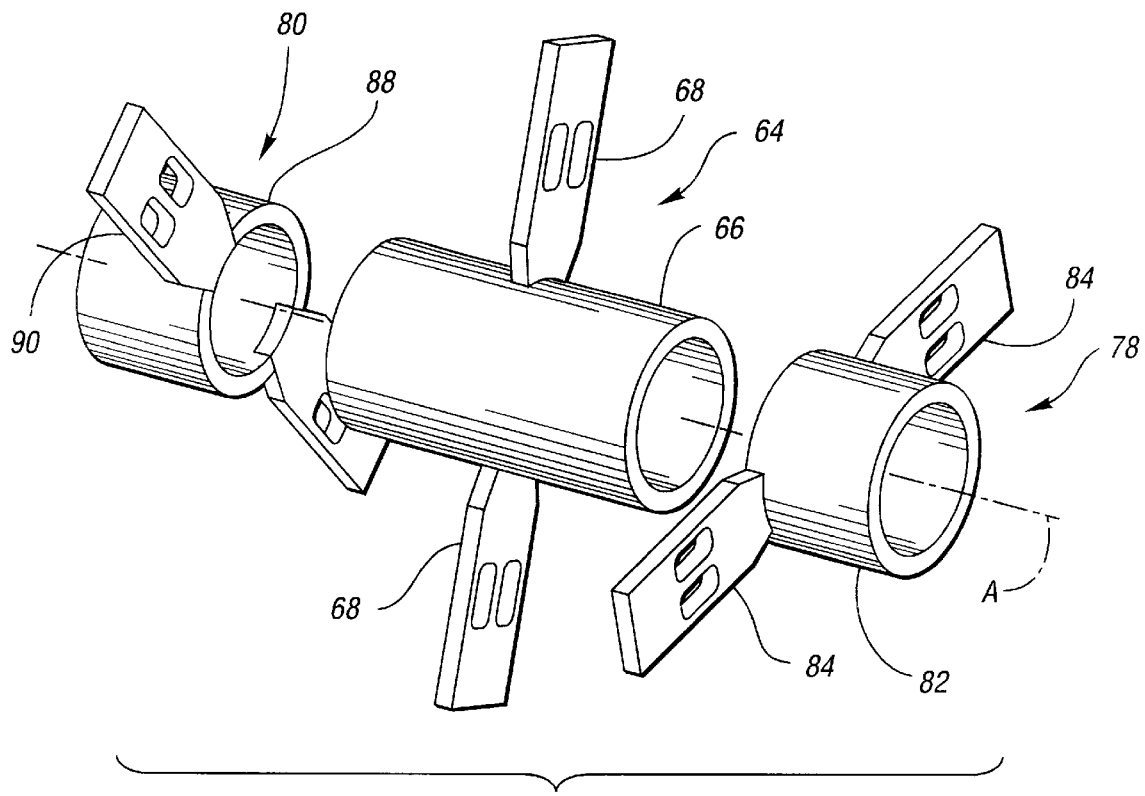
FIG. 4 is a perspective view detailing three carrier elements partially shown in the first three figures.

The first planet gear carrier 52 also has a central assembly, generally indicated in FIG. 4 by reference numeral 64, which includes a right circular cylindrical portion 66 and a pair of oppositely extending, centrally disposed, carrier arms 68, which may be integrally formed with the right circular cylindrical portion 66 or may be attached thereto by any of a number of well-known means. Each of the carrier arms 68 is affixed between the peripheral assembly portions 56 and 60 with, for example, bolts 70, or their equivalent; and the cylindrical portion 66 rotates about the output shaft terminal portion 26, a first central assembly bearing 72, which could be formed of a suitable bearing material or comprise rolling elements, being disposed therebetween.

Second and third planet gear carriers, generally indicated by reference numerals 74 and 76 respectively (best shown by FIG. 2) are symmetrically disposed about the right circular cylindrical portion 66 of the planet gear carrier central assembly 64. They are similar to the first planet gear carrier 52 except for their respective central assemblies, generally indicated by reference numerals 78 and 80 respectively.

The central assembly 78 of the second planet gear carrier 74 includes a right circular cylindrical portion 82 and a pair of oppositely extending carrier arms 84, which may be integrally formed with the right circular cylindrical portion 82 or may be attached thereto by any of a number of well-known means. The carrier arms 84 are disposed at an end of the right circular cylindrical portion 82 nearest the carrier arm 68 of the central assembly 64. Each of the carrier arms 84 is affixed between the peripheral assembly portions 56 and 60 with, for example, bolts 70, or their equivalent; and the cylindrical portion 82 rotates about the right circular cylindrical portion 66 of the central assembly 64, a second central assembly bearing 86, which could be formed of a suitable bearing material or comprise rolling elements, being disposed therebetween.

The central assembly 80 of the third planet gear carrier 76 includes a right circular cylindrical portion 88 and a pair of oppositely extending carrier arms 90, which may be integrally formed with the right circular cylindrical portion 88 or may be attached thereto by any of a number of well-known means. The carrier arms 90 are disposed at an end of the right circular cylindrical portion 88 nearest the carrier arm 68 of the central assembly 64. Each of the carrier arms 90 is affixed between the peripheral assembly portions 56 and 60 with, for example, bolts 70, or their equivalent; and the cylindrical portion 88 rotates about the right circular cylindrical portion 66 of the central assembly 64, a third central assembly bearing 92, which could be formed of a suitable bearing material or comprise rolling elements, being disposed therebetween.

The planet gear carriers 52, 74 and 76 are capable of limited, mutually independent rotation about the central axis A. This independent rotation is limited by contact between adjacent carrier arms 68, 84 and 90. In a first variation of the first preferred embodiment of the invention, resilient bumpers 94 (FIG.3), made of a material such as hard rubber, are disposed between adjacent planet gear carriers 52, 74 and 76 to maintain a minimum distance between one planet gear and another. Preferably, a resilient bumper 94 is affixed to each of opposing sides of adjacent planet gear carriers so that, they, but no other parts of or attachments to adjacent planet gear carriers, are permitted to make contact with each other.

In the first preferred embodiment, one of a pair of planet gear shafts 96 is mounted proximate a separate end of each of the planet gear carriers 52, 74 and 76 for rotation within planet gear shaft bearings 98, which could be formed of bearing material or of rolling elements. Each planet gear shaft 96 has a longitudinal axis of rotation D mutually parallel to and spaced from the central axis A and is mounted on a planet gear carrier 52, 74 or 76 by a pair of retainer rings 100.

A planet gear 102 is mounted on each of the planet gear shafts 96 for rotation thereabout. Each planet gear 102 includes peripherally disposed gear teeth 104 that engage with the gear teeth 42 of the ring gear 40. The mass of each planet gear 102 mounted on each of the pairs of planet shafts 96 is eccentrically distributed so that the rotational moment of each of the two planet gears 102 is equal and opposite to that of the other. The eccentricity of the mass distribution may be effected by the configuration of the planet gears and/or by masses inserted therein.

A stationary ring assembly, generally indicated by reference numeral 106, is affixed to the stationary member, or disk, 44 and has an axis of symmetry coincident with the central axis A. The stationary ring assembly 106 includes a first stationary ring 110 and a second stationary ring 112. The stationary rings 110 and 112 each have an inverted-L shape including a lateral extension 114 and 116 respectively that extend toward each other.

The lateral extension 114 of the smaller, first stationary ring 110 is fitted within that 116 of the larger, second stationary ring 112 so that, in cross section, the combined rings form a rectangle having defined therebetween an internal annular slot 118. The latter includes first and second lateral sides 120 and 122 respectively formed by portions of the first and second stationary rings 110 and 112. Bolts, or their equivalent, 124 secure the first and second stationary rings 110 and 112 together and to the stationary disk 44.

Each of the first and second lateral sides 120 and 122 has an annular recess 126 and 128 (FIG. 6) respectively formed therein. A portion of each annular recess has surfaces 130 and 132 respectively that converge as a linear function of annular recess depth to form a right-circular-frustum-shaped recess that, if extended, would form a cone having an apex angle of $2\alpha_2$ located on the central axis A. As shown in cross section, the surfaces 130 and 132 are canted with respect to a line F that is parallel to the central axis A, each forming an angle $\alpha_2$ therebetween.

As shown in detail in FIGS. 5 and 6, a stationary ring clutch, generally indicated by reference numeral 134, is disposed in cooperation with the flange 58 at each end of each of the planet gear carriers 52, 74 and 76 and the stationary ring assembly 106 to allow the former to rotate relative to the latter in only a first direction. The stationary ring clutch 134 comprises a compound wedge system that includes at least one stationary ring primary wedge 136 and one pair of stationary ring secondary wedges 138 and 140 for each stationary ring primary wedge 136. The stationary ring primary wedge 136 has a central longitudinal plane E extending perpendicularly to the central axis A.

Figure 18A:
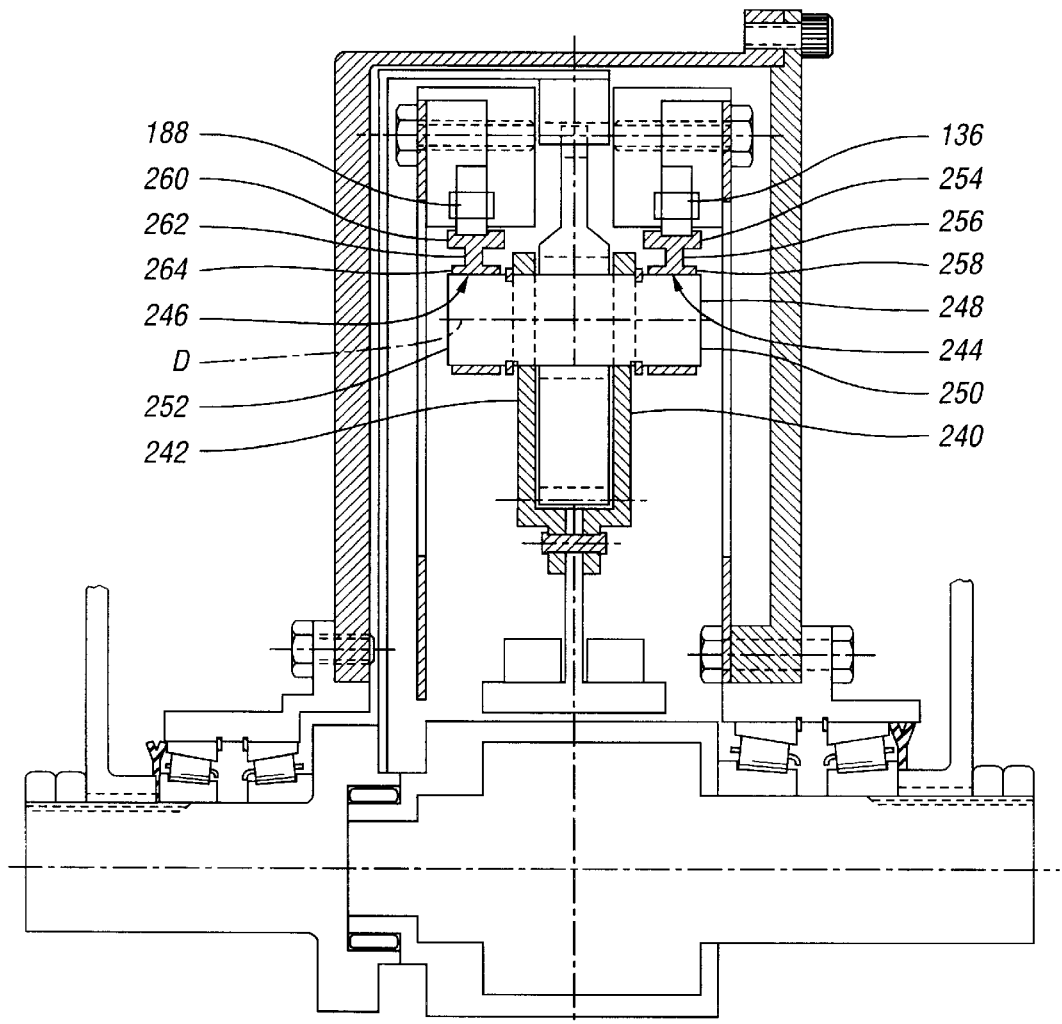
FIG. 18A is a view similar to FIG. 1 except that the first and second peripheral assembly flanges have been replaced by respective stationary ring and drive ring clutch carriers.
Figure 18B:
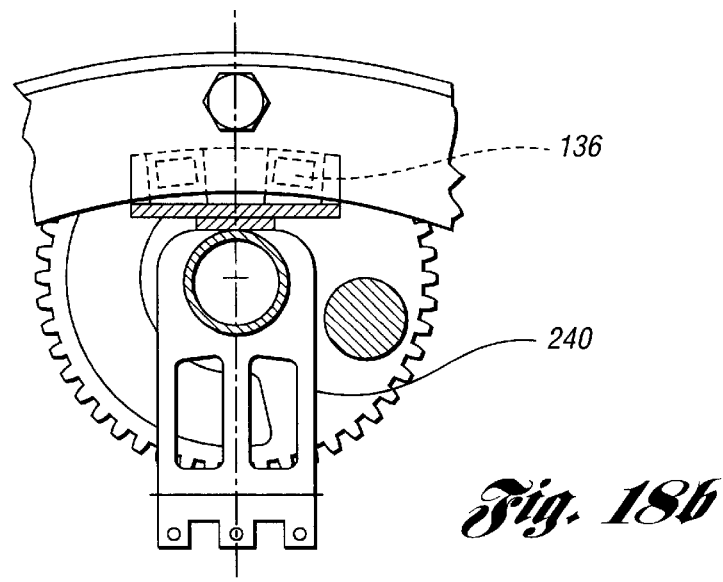
FIG. 18B is a side view, partially in section, showing additional details of the stationary ring clutch carrier of FIG. 18A.

In the first preferred embodiment, each primary wedge includes two primary wedge portions serially disposed along the stationary ring primary wedge longitudinal plane E. Since both primary wedge portions and the secondary wedges associated with each are the same, only one combination is described here in detail. Like elements of the second combination are identified by the same, but primed, reference numerals. The stationary ring primary wedge 136 is mounted on the flange 58 of the first peripheral assembly portion 56 for revolution therewith about the central axis A. As an alternative, of course, the stationary ring primary wedge 136 could be formed as a portion of the first peripheral assembly portion 56 or mounted on ring primary wedge carriers 244 and 246 (FIG. 18A and 18B).

The stationary ring primary wedge 136 has lateral sides 142 and 144 that are symmetrically disposed about its central longitudinal plane E and are equally and linearly angled relative thereto at angles $\alpha_1$ (FIG. 5). The angled lateral sides 142 and 144 of the stationary ring primary wedge 136 and the central longitudinal plane E of the primary wedge 136 define an angle $\alpha_1$ therebetween.

Figure 7:
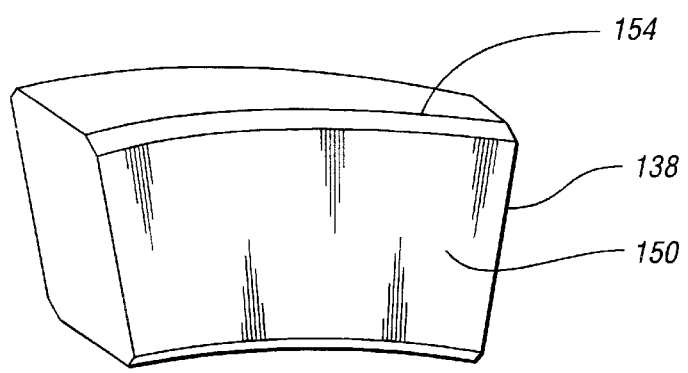
FIG. 7 is a perspective view of a representative one of a pair of secondary wedges.

Each of the pair of stationary ring secondary wedges 138 and 140, the former of which is shown in perspective in FIG. 7, is slidably disposed on a mutually opposite lateral side 142 and 144 respectively of the stationary ring primary wedge 136. Each of the pair of secondary wedges 138 and 140 has an inner lateral side 146 and 148 respectively and an outer lateral side 150 and 152 respectively.

Each inner lateral side 146 and 148 is parallel to a respective adjacent angled side 142 and 144 of the stationary ring primary wedge 136. Each outer lateral side 150 and 152 of the respective stationary ring secondary wedges 138 and 140 is parallel to the central longitudinal plane E of the stationary ring primary wedge 136. Each outer lateral side 150 and 152 has corners 154 and 156 beveled at angles equal to the angles $\alpha_2$ of convergence of respective adjacent canted surfaces 130 and 132 of the first and second annular recesses 126 and 128. The beveled corners 154 and 156 and the canted surfaces 130 and 132 define equal angles with respect to the line F.

The angle $\alpha_1$ is always chosen to be higher than the "locking angle"; that is, tan $\alpha_1 \geq \mu_{1max}$, where $\mu$ is the coefficient of friction. Typically, for hard, smooth steel on hard, smooth steel with oil lubrication, these values are $\mu_{1min} = \mu_{2min} = 0.04$ and $\mu_{1max} = \mu_{2max} = 0.1$. For these materials, the minimum angle $\alpha_1 \geq$ arc tan 0.1, or $\alpha_1 \geq 5.7°$. For the same reasons, tan $\alpha_2 \geq \mu_{2max}$. Therefore, for hard, smooth steel on hard, smooth steel grooves with oil lubrication, the minimum angle $\alpha_2 \geq 5.7°$.

The upper bounds for angles $\alpha_1$ and $\alpha_2$ are determined using the following equation:

$$\sin\alpha_2 \leq \frac{\mu_{2min}}{\tan(\alpha_1 + \beta_2)} ,$$

where $\beta_1 =$ arc tan$(\mu_{1max})$. A solution for oil-lubricated, hard, smooth steel on hard, smooth steel conditions for both wedges is the pair of values maximum $\alpha_1 \leq 8.85°$ and maximum $\alpha_2 \leq 8.85°$ when the aforementioned values of the coefficient of friction are in effect.

The wedge angles $\alpha_1$ and $\alpha_2$ are selected according to the friction coefficients of the materials from which the wedges and rings are made. These angles are usually relatively small. A value of 8° for both angles $\alpha_1$ and $\alpha_2$ is generally a workable compromise. In specific cases, depending on the actual friction coefficients, these angles are selected so that the secondary wedges will not slip when the lowest friction coefficient value applies and will not lock when the highest friction coefficient value applies.

When assembled, the stationary ring primary wedge 136 is disposed between the pair of secondary wedges 138 and 140; and the beveled edges 154 and 156 of the outer lateral sides 150 and 152 are slidably disposed adjacent the canted surfaces 130 and 132 within the respective first and second annular recesses 126 and 128 in the respective first and second stationary rings 110 and 112. If the first planet gear carrier 52 is rotated in the first direction, as can be seen from FIG. 5, the outward force exerted by the stationary ring primary wedge 136 on the adjacent pair of stationary ring secondary wedges 138 and 140 is relieved.

This reduces the friction force between the beveled edges 154 and 156 of the respective pair of secondary wedges 138 and 140 and the canted surfaces 130 and 132 within the respective first and second annular recesses 126 and 128. The pair of stationary ring secondary wedges 138 and 140 are then free to slide within the respective first and second annular recesses 126 and 128, allowing the first planet gear carrier 52 to rotate freely about the central axis A.

Any attempted rotation of the first planet gear carrier 52 in the opposite, or second, direction forces the stationary ring primary wedge 136 between the pair of secondary wedges 138 and 140, increasing the friction force between the beveled edges 154 and 156 and the canted surfaces 130 and 132. The pair of secondary wedges 138 and 140 are then prevented from sliding within the respective first and second annular recesses 128 and 128, and the first planet gear carrier 52 is not allowed to rotate about the central axis A. If the ring gear 40 is rotating while the first planet gear carrier 52 is being restrained from doing so, rotation is imparted to the planet gear 102 instead.

In a second variation of the first preferred embodiment of the invention, a pair of resilient biasing members 158 and 160 (shown symbolically in FIG. 5) are affixed to the first peripheral assembly portion flange 58 or preferably to the stationary ring primary wedge 136. Each of the resilient biasing members 158 and 160, which could be any of a number of well-known devices such as leaf or coils springs, biases a respective one of the pair of stationary ring secondary wedges 138 and 140 in a direction along the central longitudinal plane E of, and toward, the stationary ring primary wedge 136. Shoulders 159 and 161 limit the travel of the respective secondary wedges 138 and 140 in the opposite direction.

In the first preferred embodiment, a drive ring assembly, generally indicated by reference numeral 108 (FIG. 1), is affixed to the forward drive member, or disk, 48 for rotation therewith about the central axis A. The drive ring assembly 108 includes a first drive ring 162 and a second drive ring 164. The drive rings 162 and 164 each have an inverted-L shape including a lateral extension 166 and 168 respectively that extend toward each other.

The lateral extension 166 of the smaller, first drive ring 162 is fitted within that 168 of the larger, second drive ring 164 so that, in cross section, the combined rings form a rectangle having defined therebetween an internal annular slot 170. The latter includes first and second lateral sides 172 and 174 respectively formed by portions of the first and second stationary rings 162 and 164. Bolts, or their equivalent, 176 secure the first and second drive rings 162 and 164 together and to the forward drive disk 48.

Each of the first and second lateral sides 172 and 174 has an annular recess 178 and 180 (FIG. 9) respectively formed therein. A portion of each annular recess has surfaces 182 and 184 respectively that converge as a linear function of annular recess depth to form a right-circular-frustum-shaped recess that, if extended, would form a cone having an apex angle of $2\alpha_2$ located on the central axis A. As shown in cross section, the surfaces 182 and 184 are canted with respect to a line H that is parallel to the central axis A, each forming an angle $\alpha_2$ therebetween.

As shown in detail in FIGS. 8 and 9, a drive ring clutch, generally indicated by reference numeral 186, is disposed in cooperation with the flange 62 at each end of each of the planet gear carriers 52, 74 and 76 and the drive ring assembly 108 to allow the former to rotate relative to the latter in only a second direction. The drive ring clutch 186 comprises a compound wedge system that includes at least one drive ring primary wedge 188 and one pair of drive ring secondary wedges 190 and 192 for each drive ring primary wedge 188. The drive ring primary wedge 188 has a central longitudinal plane G extending perpendicularly to the central axis A.

In the first preferred embodiment, each primary wedge includes two primary wedge portions serially disposed along the stationary ring primary wedge longitudinal plane G. Since both primary wedge portions and the secondary wedges associated with each are the same, only one combination is described here in detail. Like elements of the second combination are identified by the same, but primed, reference numerals. The drive ring primary wedge 188 is mounted on the flange 62 of the second peripheral assembly portion 60 for revolution therewith about the central axis A. As an alternative, of course, the drive ring primary wedge 188 could be formed as a portion of the second peripheral assembly portion 60.

The drive ring primary wedge 188 also has lateral sides 198 and 200 that are symmetrically disposed about its central longitudinal plane G and are equally and linearly angled relative thereto at angles $\alpha_1$ (FIG. 8). The angled lateral sides 198 and 200 of the drive ring primary wedge 188 and the central longitudinal plane G of the primary wedge 188 define an angle $\alpha_1$ therebetween. A value of 8° for both angles $\alpha_1$ and $\alpha_2$ is generally a workable compromise when the material of both primary and secondary wedges is hard, smooth steel and there is oil lubrication between the contact surfaces.

Each of the pair of drive ring secondary wedges 190 and 192, represented by the wedge 138 shown in perspective in FIG. 7, is slidably disposed on a mutually opposite angled lateral side 194 and 196 respectively of the drive ring primary wedge 188. Each of the pair of secondary wedges 190 and 192 has an inner lateral side 198 and 200 respectively and an outer lateral side 202 and 204 respectively, represented by the side 150 in FIG. 7.

Each inner lateral side 198 and 200 is parallel to a respective adjacent angled side 194 and 196 of the drive ring primary wedge 188. Each outer lateral side 202 and 204 of the respective drive ring secondary wedges 190 and 192 is parallel to the central longitudinal plane G of the drive ring primary wedge 188. Each outer lateral side 202 and 204 has corners 206 and 208 beveled at angles equal to the angles $\alpha_2$ of convergence of respective adjacent canted surfaces 182 and 184 of the first and second annular recesses 178 and 180. The beveled corners 206 and 208 and the canted surfaces 182 and 184 define angles with respect to the line H that are equal.

The angles $\alpha_1$ and $\alpha_2$ associated with the drive ring clutch 186 are a function of the same factors as the same angles associated with the stationary ring clutch 134. Thus, for oil-lubricated, hard, smooth steel on hard, smooth steel grooves, the minimum angles of both wedges are $\alpha_1 \geq 5.7°$ and $\alpha_2 \geq 5.7°$; and the maximum angles of both wedges $\alpha_1$ and $\alpha_2$ are determined using the previous equation where the minimum and maximum values of the $$\sin\alpha_2 \leq \frac{\mu_{2min}}{\tan(\alpha_1 + \beta_2)} ,$$

coefficient of friction are 0.04 and 0.1 respectively. In this case a solution for maximum angles is the pair of values $\alpha_1 \leq 8.85°$ and $\alpha_2 \leq 8.85°$.

When assembled, the drive ring primary wedge 188 is disposed between the pair of secondary wedges 190 and 192. The drive ring primary wedge 188 is oriented in the opposite direction with respect to the stationary ring primary wedge 136. The beveled edges 206 and 208 of the outer lateral sides 202 and 204 are slidably disposed adjacent the canted surfaces 182 and 184 within the respective first and second annular recesses 178 and 180 in the respective first and second drive rings 162 and 164.

As can be seen from FIG. 9, if the first planet gear carrier 52 is rotated in the first direction, the outward force exerted by the drive ring primary wedge 188 on the adjacent pair of drive ring secondary wedges 190 and 192 increases the friction force between the beveled edges 206 and 208 of the respective pair of secondary wedges 190 and 192 and the canted surfaces 182 and 184 within the respective first and second annular recesses 178 and 180. This locks the clutch, forcing the drive ring assembly 108 to rotate in the first direction as well. This rotates the output shaft 24, which is attached to the drive ring assembly 108, in the first direction.

Since the stationary and drive ring clutches for the second and third gear carriers 74 and 76 are the same as those for the first planet gear carrier 52, the detailed description of the stationary and drive ring clutches 134 and 186 for first planet gear carrier 52 applies to them as well.

In the second variation of the first preferred embodiment of the invention, a pair of resilient biasing members 210 and 212 (shown symbolically in FIG. 8) are also affixed to the first peripheral assembly portion flange 62 or preferably to the drive ring primary wedge 188. Each of the resilient biasing members 210 and 212, which could be any of a number of well-known devices such as leaf or coils springs, biases a respective one of the pair of drive ring secondary wedges 190 and 192 in a direction along the central longitudinal plane G of, and toward, the drive ring primary wedge 188. Shoulders 211 and 213 limit the travel of the respective secondary wedges 190 and 192 in the opposite direction.

Figure 3:
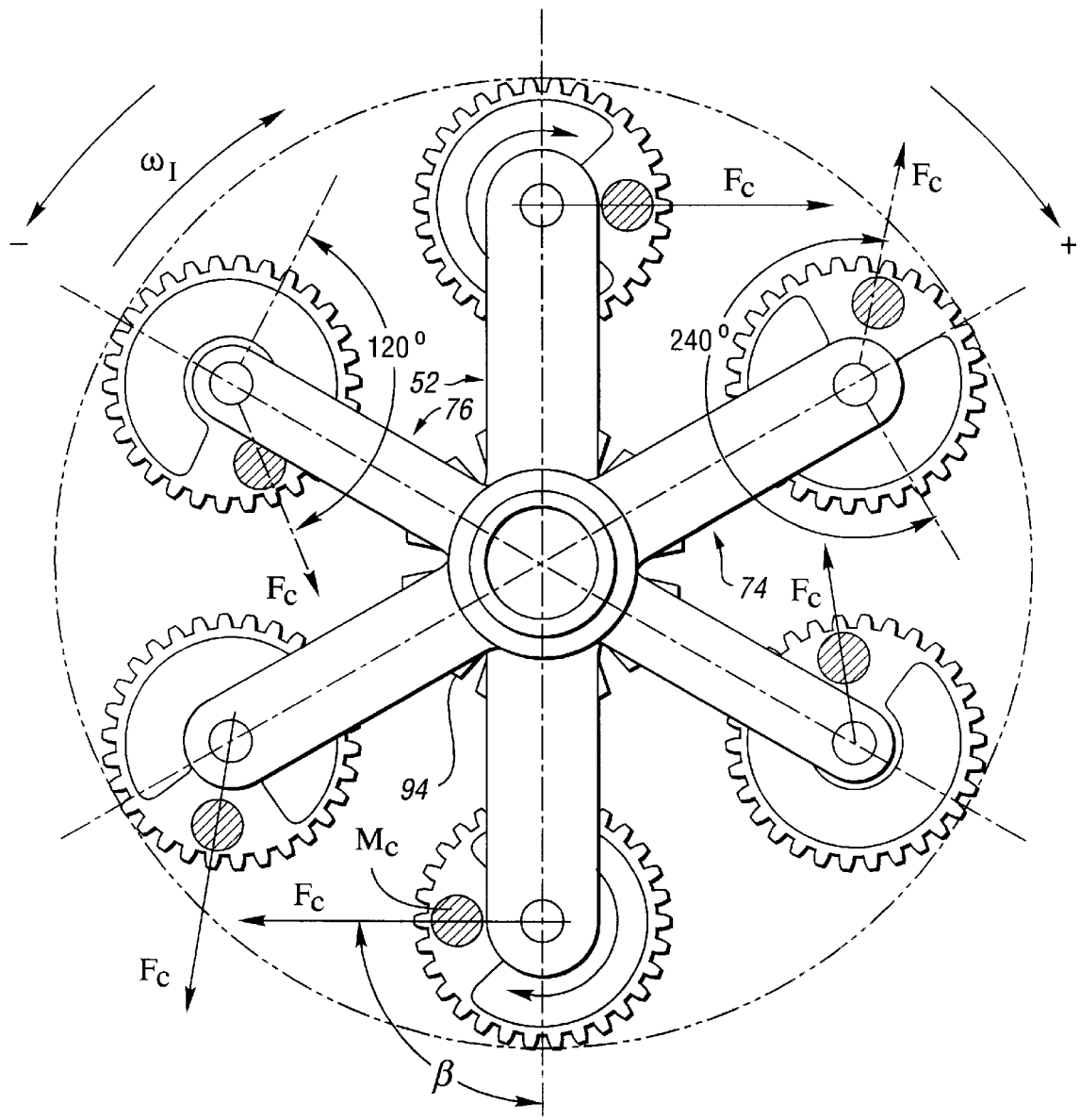
FIG. 3 is a simplified view similar to that of FIG. 2 and illustrating the relative angular disposition of centrifugal forces resulting from planet gear motion.

In the first preferred embodiment of the invention, as each planet gear rotates, its eccentrically disposed mass generates a centrifugal force $F_c$ acting radially away from the center of planet gear rotation. This is shown by FIG. 3. As each planet gear rotates about its longitudinal axis D, the eccentrically disposed mass in each planet gear generates a torque about the central axis A. Since each planet gear is disposed at an opposite end of a gear carrier from another planet gear to form a pair, and the mass of each of the pair of planet gears is eccentrically distributed so that the rotational moment of each of the two planet gears is equal and opposite to that of the other, the components of centrifugal forces acting radially away from the central axis A cancel each other.

Tangential centrifugal force components, however, acting as couples, are transferred to the planet gear carriers 52, 74 and 76. The amplitude of torque generated by each pair of planet gears varies sinusoidally as the gears rotate; therefore, the torque applied to each planet gear carrier is pulsed. The relative angular disposition $\phi$ between centrifugal force vectors of adjacent planet gears in this first preferred embodiment of the invention is substantially 120°. As a result, torque pulses applied to the planet gear carriers 52, 74 and 76 are mutually 120° out of phase.

When the planet gear carriers 52, 74 and 76 are prevented from rotating by the locked stationary ring clutch 134, and by restraining the output shaft 24, which is connected to the drive ring clutch 186, a pulsed torque is transmitted to and absorbed by the stationary disk 44 and a pulsed torque, in the opposite direction, is transmitted to the output shaft 24. Three evenly spaced torque pulses are thus applied to the output shaft 24 during one complete rotation of a planet gear about its axis D. It is in this even spacing of torque pulses that an advantage of the present invention resides, the even spacing resulting in a smoother output than that produced by having all the torque pulses in phase.

If a different number of gear carriers are used, for example, five instead of three, the relative angular disposition $\phi$ between centrifugal force vectors of adjacent planet gears would be 72°; and five evenly spaced torque pulses would be applied to the output shaft 24 during one complete rotation of a planet gear about its axis D. The angle $\phi$ may be calculated for embodiments using any number of planet gear carriers by the general equation $\phi=360°/n$, where n represents the number of planet gear carriers.

Since the rotating parts are subject to accelerations during the operation of the inertial power transmission, they are naturally formed of materials having high strength-to-weight ratios and are configured so that their moments of inertia are as low as is practical.

OPERATION

Figure 2:
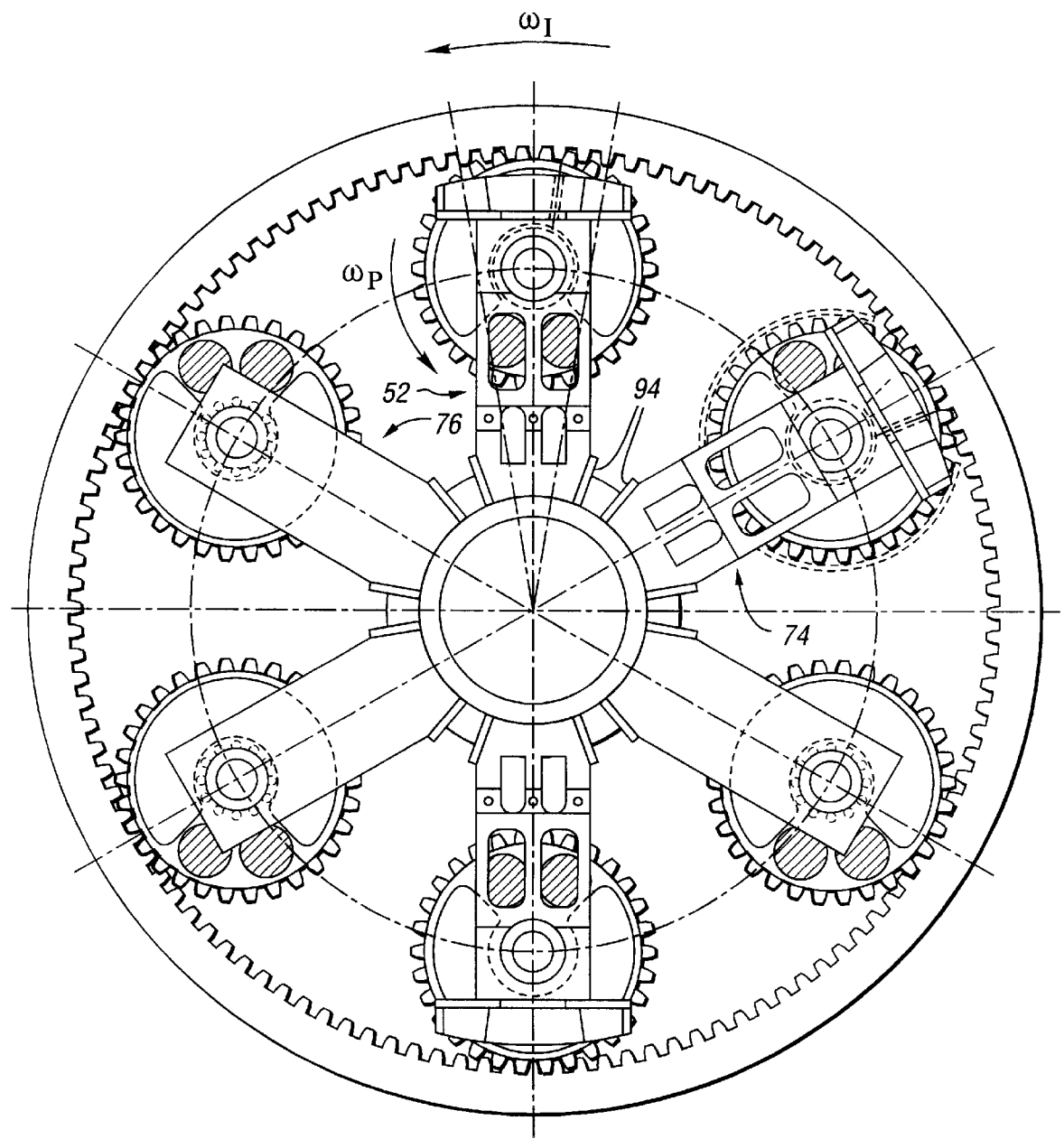
FIG. 2 is a view of the present invention taken along the rotational axis of an input shaft and showing a driving ring gear and the relative angular disposition of planet gears and their associated carriers.

With reference to FIGS. 1 and 2, a rotation of the input shaft 18 in the first direction causes the input disk 34 to rotate in the same direction, likewise rotating the ring gear 40 in the first direction. The ring gear 40 attempts to rotate planet gears engaged therewith in the first direction.

With the output shaft 24 stalled, as the center of eccentric mass $m_c$ of each of a pair of planet gears passes its radially outermost position with respect to the central axis A, as shown by FIG. 3, a tangential component of the centrifugal force $F_c$ associated therewith creates a couple acting to rotate the respective planet gear carrier in the first direction. The couple has a value given by the following equation:

$$F_{couple}=F_c \times 2r \sin \beta,$$

where $F_c$ is the centrifugal force generated by the eccentric mass $m_c$, r is the distance from the central axis A to the planet gear shaft longitudinal axis D, and $\beta$ is the angle of revolution of the center of the eccentric mass $m_c$ about the planet gear shaft longitudinal axis D with respect to the planet gear carrier.

The amplitude of the couple reaches a maximum when the centers of eccentric masses $m_c$ of the pair of planet gears have revolved 90°, and it reaches a minimum when the centers of the eccentric masses $m_c$ have reached their innermost positions with respect to the central axis A. The couple acts through the automatically engaging drive ring clutch 186 to urge the forward drive disk 48 to rotate, which in turn rotates the output shaft 24 in the same direction as the input shaft 18.

As the center of the eccentric mass $m_c$ of each of the pair of planet gears 102 passes its radially innermost position with respect to the central axis A, the centrifugal force associated therewith creates a couple acting to rotate the respective planet gear carrier in the opposite direction. Any actual rotation of a gear carrier 52 in the opposite direction would cause a stationary ring clutch 134 to engage, applying torque from the oppositely acting couple to the reaction member, or stationary disk 44. No reverse torque would be applied to the output shaft 24 as a result of this opposite couple because the drive ring clutch 186 would automatically disengage, allowing the output shaft 24 to rotate freely.

The amount of output torque being generated at any time is the positive value (only) of the following general equation:

$$L_n = m_c \times r_c \times 2r \times \omega_p^2 \left[ \sum_{K=0}^{K=n} \sin\left(\beta + K\frac{360}{n}\right) \right],$$

where n is the number of pairs of planet gears, $m_c$ is the eccentric mass, $r_c$ is the distance from the planet gear shaft longitudinal axis D to the eccentric mass $m_c$, r is the distance from the central axis A to the planet gear shaft longitudinal axis D, and $\beta$ is the angle of revolution of the of the center of the eccentric mass $m_c$ about the planet gear shaft longitudinal axis D with respect to the planet gear carrier.

For the first preferred embodiment of the present invention, which has three planet gear carriers 52, 74 and 76, n equals 3. The value of a function $L_3$ for this case is graphically represented by FIG. 10, where the ordinate axis (y-axis) represents the output torque amplitude and the coordinate axis (x-axis) represents the angle $\beta$. The sinusoidal curve O-E-Z represents the torque output of the pair of planet gears 102 mounted on the planet gear carrier 52 as shown by FIG. 3. The angle $\beta$ is approximately 90° and is represented by the point E in FIG. 10. The sinusoidal curve O-E-Z is displaced by 120° and is repeated along the x-axis in forward and backward directions from the origin O. As shown, the graphical sum of torques represented by these curves produces a curve A-B-C-D-E-F-G-H- . . . , which represents a positive torque resultant.

The distance $\epsilon$ (not drawn to scale) between the curve maximums and minimums, for example, A and B respectively, represents the unevenness of the output torque. In principle, the unevenness decreases as the number of pairs of planet gears, increases. It can be shown, however, that odd numbers of planet gear pairs provide smoother torque resultant curves. The preferred numbers of planet gear pairs, therefore, are 3, 5, 7, 9 and so forth. This is illustrated by the graphic representations in FIGS. 11A through 11D.

Torque generated by each pair of planet gears may be represented by a rotating vector. Such a vector for an inertial power transmission having three pairs of planet gears is represented by the graph in FIG. 11A. Torque generated by each pair of planet gears is respectively represented by vectors labeled OA, AB and BO. The amplitude of positive torque at any instant is represented by dimension OB' along the y-axis, where OB' represents a projection on that axis of the last vector in the series to form an angle of 180° or less with the x-axis.

As the triangle of vectors rotates counterclockwise, as shown by a curved arrow, about the origin O, the vector OA describes an angle $\beta$ with respect to the x-axis. Vectors AB and BO respectively describe angles $\beta+120°$ and $\beta+240°$. Since vector BO forms with the x-axis an angle greater than 180°, it does not represent any positive torque. When the triangle is rotated to a position where the point B is on the y-axis, a maximum amplitude of positive torque, represented by the length of the vector BO, is indicated.

When the triangle has rotated to a position where the vector AB is parallel to the x-axis, the amplitude of the torque is then represented by a projection on the y-axis of the vector OB, which is the height of the triangle at that instant. This vertical projection represents the minimum amplitude of positive torque, and its amplitude is defined by the equation:

$$L = OB \times \cos \phi,$$

where $\phi$ is the angle between the vector OB and the y-axis. In the instant case, since the triangle is equilateral, the angle $\phi$ is 30°; therefore, the torque would be 0.866 of the maximum torque. Expressed proportionally, the unevenness $\epsilon$ (FIG. 10) would thus be 13.39 percent.

Generally, the ratio of maximum torque to minimum torque is equal to the ratio of the maximum diagonal to the height of the associated polygon formed by the vectors representing the torque generated by each planet gear pair. This is confirmed by reference to graphic representations in FIGS. 11A through 11D. Since the vectors OA always extend along the x-axis, each forms the base of a polygon. As illustrated by any of the polygons having an odd number of sides, for example, that shown by FIG. 11C, the longest diagonal OC represents the maximum torque, and the vertical distance to the vertex C, when projected onto the y-axis, represents the height of the polygon and thus the minimum torque OC'. As illustrated by any of the polygons having an even number of sides, for example, that shown by FIG. 11D, the longest diagonal OC represents the maximum torque, and the height of the polygon OD represents the minimum torque. A trigonometric analysis of the FIGS. 11A through 11B also indicates that the ratio of the maximum torque to the minimum torque is equal to $\cos \phi$.

The relationship between decreased torque unevenness and increased number of pairs of planet gears and that between the smoother output torque of odd numbers of pairs as opposed to that of even numbers of pairs is illustrated by the following table.

| n | $\phi$ | $\epsilon$ |
|---|---|---|
| 3 | 30 | 13.39 |
| 4 | 45 | 29.29 |
| 5 | 18 | 4.84 |
| 6 | 30 | 13.39 |

The table indicates that the percentage of unevenness $\epsilon$ for inertial power transmissions respectively having 3 and 6 pairs of planet gears is the same. As the number n of pairs of pairs of planet gears increases, the difference in unevenness between odd and the following even number of pairs progressively decreases.

It can be appreciated from FIGS. 11C and 11D that the value of $\phi$ is one half of that of the central angle c for polygons having an even number of sides and one quarter of the value of the central angle c for polygons having an odd number of sides. The percentage of unevenness $\epsilon$ is given by the following equation:

$$\epsilon = 100(1 - \cos(360/2n))$$

when the number of pairs of planet gears 102 is even, and is given by the equation:

$$\epsilon = 100(1 - \cos(360/4n)),$$

when the number of pairs of planet gears 102 is odd. The reference character n represents the number of pairs of planet gears 102.

When the output shaft 24 is allowed to rotate, driving a load, the forces involved in accelerating the planet gear carriers are primarily the result of centrifugal forces arising from revolving the eccentric masses $m_c$ of the planet gears and are secondarily the result of Coriolis forces. Since the input shaft 18 drives a ring gear 40 rather than a sun gear (not shown) to in turn drive the planet gears, the vector products of the relative velocity vectors of the eccentric masses $m_c$ and the carrier rotation velocity vectors $\omega_c$ are in directions such that the Coriolis forces are additive to the centrifugal forces whether the output shaft 24 rotates in the same direction as, or in the opposite direction to, the input shaft 18. The amplitude of the output torque is therefore greater than it would be if it was the result of the centrifugal forces alone.

This advantage is not derived if the planet gears are driven by a sun gear (not shown) connected to the input shaft 18. In fact, with a sun gear driving the planet gears, Coriolis forces would be opposite to the centrifugal forces. This would result in a reduced inertial power transmission torque capacity for the same input and output shaft speeds.

Figure 12:
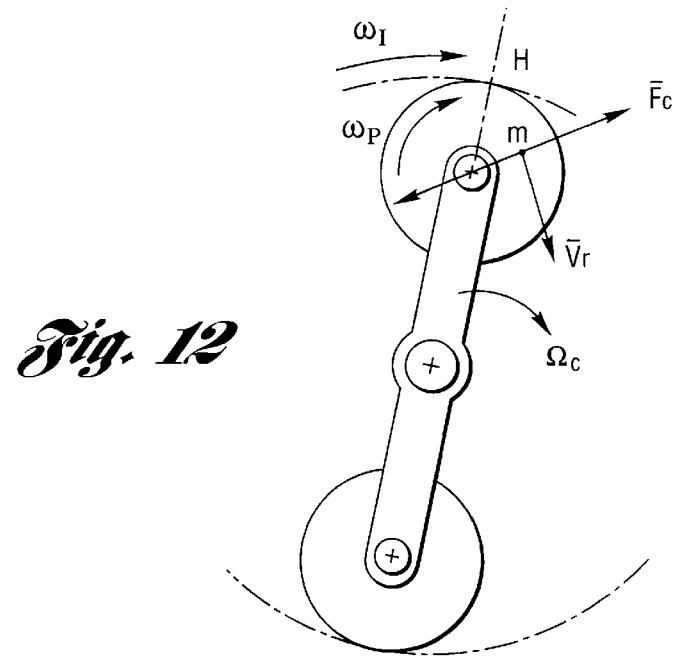
FIG. 12 is a representative view of a ring gear, a single planet gear carrier, and a pair of planet gears illustrating the rotation and relative velocities contributing to the creation of Coriolis forces.

FIG. 12 illustrates the relative dispositions of factors effecting the Coriolis forces. The Coriolis acceleration of the eccentric mass $m_c$ is given by the vector product of the vector $V_r$ (which is the velocity of the mass m relative to the planet gear carrier, and which is tangential to a circle described by the center of the eccentric mass $m_c$ as it revolves about the planet gear shaft) and the planet gear carrier rotational velocity vector $\omega_c$ (which is perpendicular to and pointing into the plane of the paper). The foregoing can be expressed mathematically by the following equation:

$$a_c = \omega_c \times V_r,$$

which is represented by a vector $a_c$ in the plane of the paper and which points from the center of the eccentric mass $m_c$ toward the axis of rotation of the planet gear. The inertial force with which the eccentric mass $m_c$ pulls away from the planet gear carrier is, therefore, represented by a vector pointing in the opposite direction and having a value (modulus) expressed by the following equation:

$$F_c = m \times \omega \times V_r,$$

which, as shown in FIG. 12, is additive to the centrifugal force.

When the output shaft 24 is rotating at any constant angular velocity, the shape of the torque pulses is indicated by the shaded areas of FIG. 10. The first torque pulse of the first pair of planet gears is shown as O-E-Z. During the first portion O-E of this torque pulse, the first planet gear carrier 52 of the first planet gear pair is being accelerated from a standstill.

When its angular velocity equals that of the output shaft 24, the one-way drive ring clutch 186 engages, connecting the first planet gear carrier 52, through the forward drive disk 48, to the output shaft 24. At this point, the second portion E-Z of the torque pulse is communicated to the output shaft 24. To deliver high-amplitude torque pulses, the portion O-E is minimized by minimizing the mass and moment of inertia of the first planet gear carrier 52. This maximizes the portion E-Z of the torque pulse.

Figure 13A:
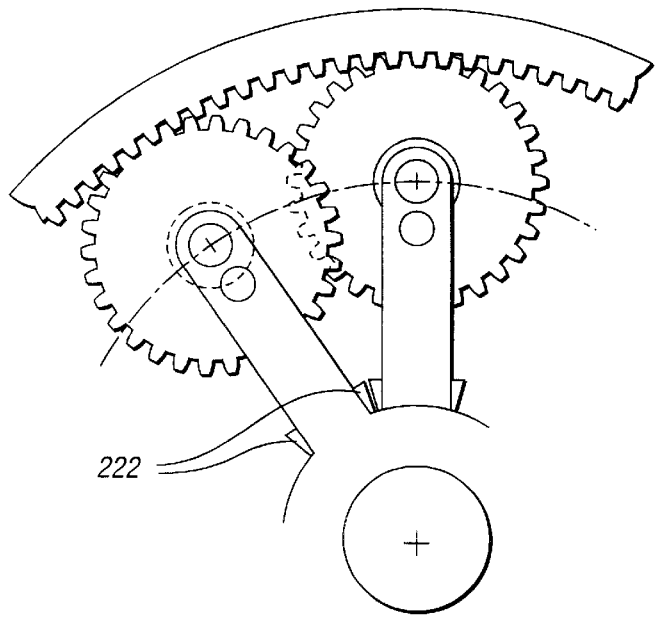
FIG. 13A is a side view, partially broken away, of the ring gear, portions of two adjacent planet gear carriers and their respective, overlapping planet gears.
Figure 13B:
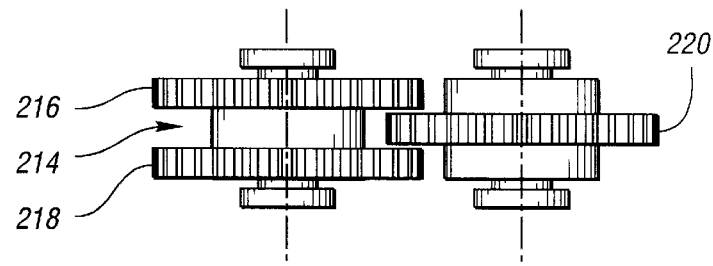
FIG. 13B is a plan view of the elements of FIG. 13A showing details of the construction of adjacent planet gears that allow them to overlap.

As stated previously, the more pairs of planet gears used, the higher and smoother the output torque. In the first preferred embodiment of the inertial power transmission, a certain number of planet gear pairs may be used without interference between adjacent planet gears. In a third variation of the first preferred embodiment of the inertial power transmission, as shown by FIGS. 13A and 13B, to accommodate a larger number of planet gear pairs within the ring gear 40, the active face width of every other adjacent planet gear is divided by an annular recess, generally indicated by reference numeral 214, leaving first and second active face width portions 216 and 218. The first and second active face widths 216 and 218 combined are slightly smaller than the width of the annular recess 214 therebetween.

The active face width 220 of the adjacent, non recessed planet gear is equal to the combined first and second active face widths 216 and 218 and thus fits within the annular recess therebetween with sufficient clearance that adjacent, overlapping planet gears may rotate independently without laterally contacting each other. The fact that the total active face widths of all planet gears are equal ensures that the amount of active planet gear face coming into contact with the ring gear 40 is the same for every planet gear and that all planet gears have the same total mass and the same mass distribution.

FIGS. 13A and 13B illustrate the overlap of adjacent planet gears permitted by the configuration just described. This allows a greater number of planet gear carriers and planet gear pairs to be used compared with the number allowed in an inertial power transmission that does not have overlapping planet gears. Also shown in FIG. 13A are stops 222 disposed on each planet gear carrier to prevent adjacent planet gears from coming into contact with each other.

In a fourth variation of the first preferred embodiment of the inertial power transmission, as shown by FIGS. 14 through 17B, rolling elements such as balls 224, hemispherically ended rollers 226 and chamfer-ended rollers 228 are used in place of the first and second stationary ring secondary wedges 138 and 140 (FIG. 9) respectively and first and second drive ring secondary wedges 190 and 192, and their primed counterparts, respectively.

Figure 14:
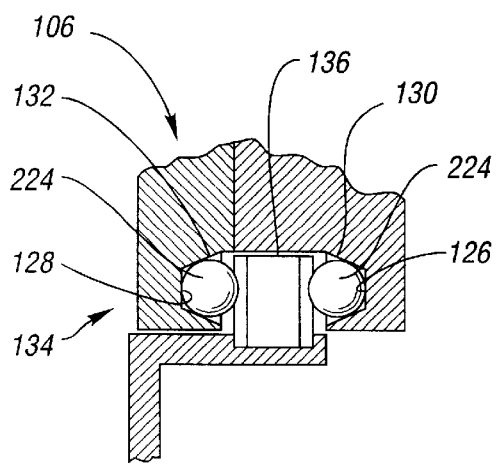
FIG. 14 is a sectional view of a portion of a stationary ring assembly showing details of the construction of a stationary ring clutch using balls for secondary wedges.

FIG. 14 is a sectional view of a portion of the stationary ring assembly, generally indicated by reference numeral 106, and includes a portion of the stationary ring clutch, generally indicated by reference numeral 134. A pair of balls 224 are disposed between the stationary ring primary wedge 136 and the canted surfaces 130 and 132 adjacent the first and second annular recesses 126 and 128 respectively. The geometric configurations of the stationary ring primary wedge 136 and the canted surfaces 130 and 132 define their contacts with the balls 224 as being point contacts. The contact stresses associated with such point contacts are naturally higher than those associated with distributed contacts such as those between the stationary ring primary wedge 136 and the stationary ring secondary wedges 138 and 140 (FIG. 9).

Figure 15:
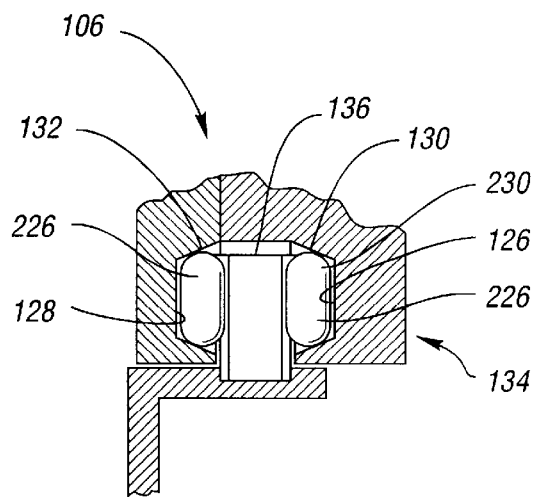
FIG. 15 is a sectional view of a portion of the stationary ring assembly showing details of the construction of a stationary ring clutch using spherically ended rollers for secondary wedges.

FIG. 15 is a view similar to that of FIG. 14 except that hemispherically ended rollers 226 have been substituted for the balls 224. The geometric configuration of the stationary ring primary wedge 136 defines its contacts with the rollers 226 as being line contacts. The contact stresses associated with such line contacts are naturally higher than those associated with distributed contacts such as those between the stationary ring primary wedge 136 and the stationary ring secondary wedges 138 and 140 (FIG. 9) but are lower than those associated with point contacts such as those between the stationary ring primary wedge 136 and the balls 224 and between the canted surfaces 130 and 132 and the hemispherically shaped ends 230 of the rollers 226.

Figure 16:
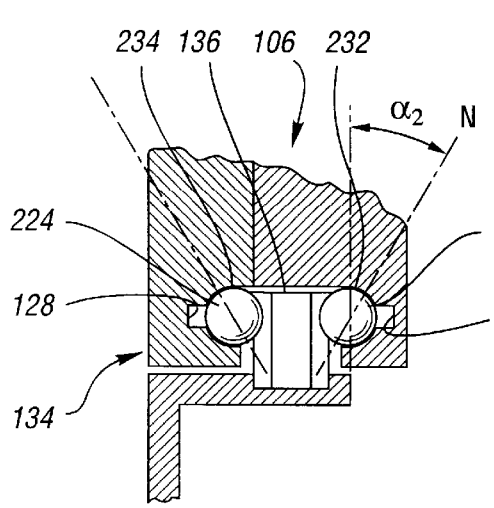
FIG. 16 is a view similar to FIG. 14, but canted surfaces contacting the balls have been replaced by sectionally curved surfaces.

FIG. 16 is a view similar to that of FIG. 14, but the canted surfaces 130 and 132 have been replaced by sectionally curved surfaces 232 and 234 each having a radius of curvature substantially equal to those of the balls 224. The geometric configuration of the stationary ring primary wedge 136, as before, defines its contacts with the balls 224 as being point contacts, contact stresses associated with such contacts being higher than those associated with distributed contacts such as those between the stationary ring primary wedge 136 and the stationary ring secondary wedges 138 and 140 (FIG. 9).

The geometric configuration of the curved surfaces 232 and 234, however, defines their contacts with the balls 224 as being distributed contacts. Contact stresses associated with such distributed contacts are also higher than those associated with distributed contacts such as those between the stationary ring primary wedge 136 and the stationary ring secondary wedges 138 and 140 (FIG. 9) but are lower than those associated with the point contacts or line contacts previously discussed.

Although not shown, the canted surfaces 130 and 132 shown by FIG. 15 could be replaced by the curved surfaces 232 and 234 shown by FIG. 16 to accommodate hemispherically ended rollers 226 the hemispherical ends 230 of which having the same radii of curvature as the curved surfaces 232 and 234. This would provide distributed contacts between the curved surfaces 232 and 234 and the hemispherically shaped ends 230 of the rollers 226. Contact stresses produced would be comparable to those associated with the distributed contacts between the curved surfaces 232 and 234 and the balls 224. The normal N to the curved surfaces 232 and 234 forms an angle $\alpha_2$ with respect to the vertical that is equal to the wedge angle $\alpha_2$ previously described with respect to the secondary wedges.

Figure 17A:
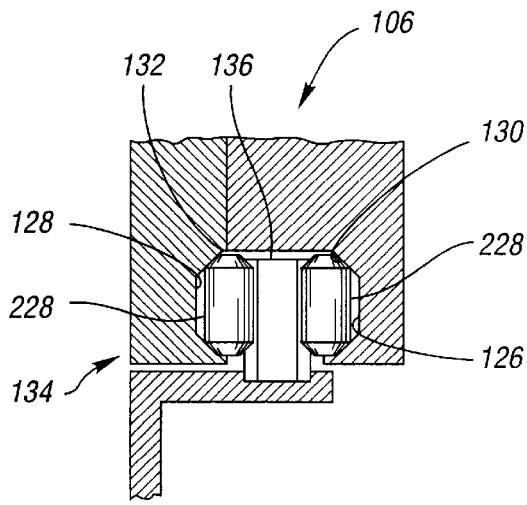
FIG. 17A is a view similar to that of FIG. 15 except that the hemispherically ended rollers have been replaced by chamfer-ended rollers.
Figure 17B:
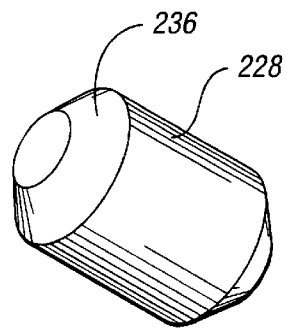
FIG. 17B is a view showing details of the hemispherically ended rollers of FIG. 17A.

FIG. 17A is a view similar to that of FIG. 15 except that the hemispherically ended rollers 226 have been replaced by chamfer-ended rollers 228. As shown by FIG. 17B, the rollers 228 have chamfered ends 236. The geometric configuration of the stationary ring primary wedge 136 defines its contacts with the rollers 228 as being line contacts. The contact stresses produced would be comparable to those associated with the line contacts between the stationary ring primary wedge 136 and the hemispherically ended rollers 226.

The geometric configuration of the canted surfaces 130 and 132 defines their contacts with the chamfered ends 236 of the hemispherically ended rollers 226 as being line contacts. The contact stresses produced would be lower than those associated with the point contacts between the hemispherically ended rollers 226 and the canted surfaces 130 and 132 but higher than those associated with the line contacts between the stationary ring primary wedge 136 and the chamfer-ended rollers 228.

In a fifth variation of the first preferred embodiment of the inertial power transmission, as shown by FIG. 18A, the first and second peripheral assembly portions 56 and 60 (FIG. 1) have been S replaced by respective first and second peripheral assembly portions 240 and 242. As also shown, the first and second peripheral assembly flanges 58 and 62 (FIG. 1) have been respectively replaced by a stationary ring primary wedge carrier, generally indicated by reference numeral 244, and a drive ring primary wedge carrier, generally indicated by reference numeral 246. As shown, cross sections of portions of these components are generally shaped similarly to that of an I-beam. In addition, the planet gear shaft 96 has been replaced with a similar but longer planet gear shaft 248 having first and second ends 250 and 252 respectively.

FIG. 18B shows the stationary ring primary wedge carrier 244 and associated components of FIG. 18A from the side. The stationary ring primary wedge carrier 244 includes a stationary ring primary wedge mounting portion 254 to which the stationary ring primary wedge 136 is affixed. A web 256 attaches the stationary ring primary wedge mounting portion 254 to a right circular cylindrical portion 258. The right circular cylindrical portion 258 is mounted on the planet gear shaft 248 near the first end 250 thereof, where it is free to move angularly about, and linearly in the direction of, the axis D of the planet gear shaft 248 as urged by motions of the stationary ring primary wedge 136.

The drive ring primary wedge carrier 246 includes a drive ring primary wedge mounting portion 260 to which the drive ring primary wedge 188 is affixed. A web 262 attaches the drive ring primary wedge mounting portion 260 to a right circular cylindrical portion 264. The right circular cylindrical portion 264 is mounted on the planet gear shaft 248 near the second end 252 thereof, where it is free to move angularly about, and linearly in the direction of, the axis D of the planet gear shaft 248 as urged by motions of the drive ring primary wedge 188.

The inertial power transmission of the present invention is especially well suited for vehicular applications because the relatively large mass of a vehicle (not shown) acts as an effective flywheel when an output shaft is connected to the vehicle's driving wheels. Particularly when the angular velocity of the output shaft is high, the large mass absorbs, damps and smooths the output torque variations caused by the application of torque pulses.

Figure 19:
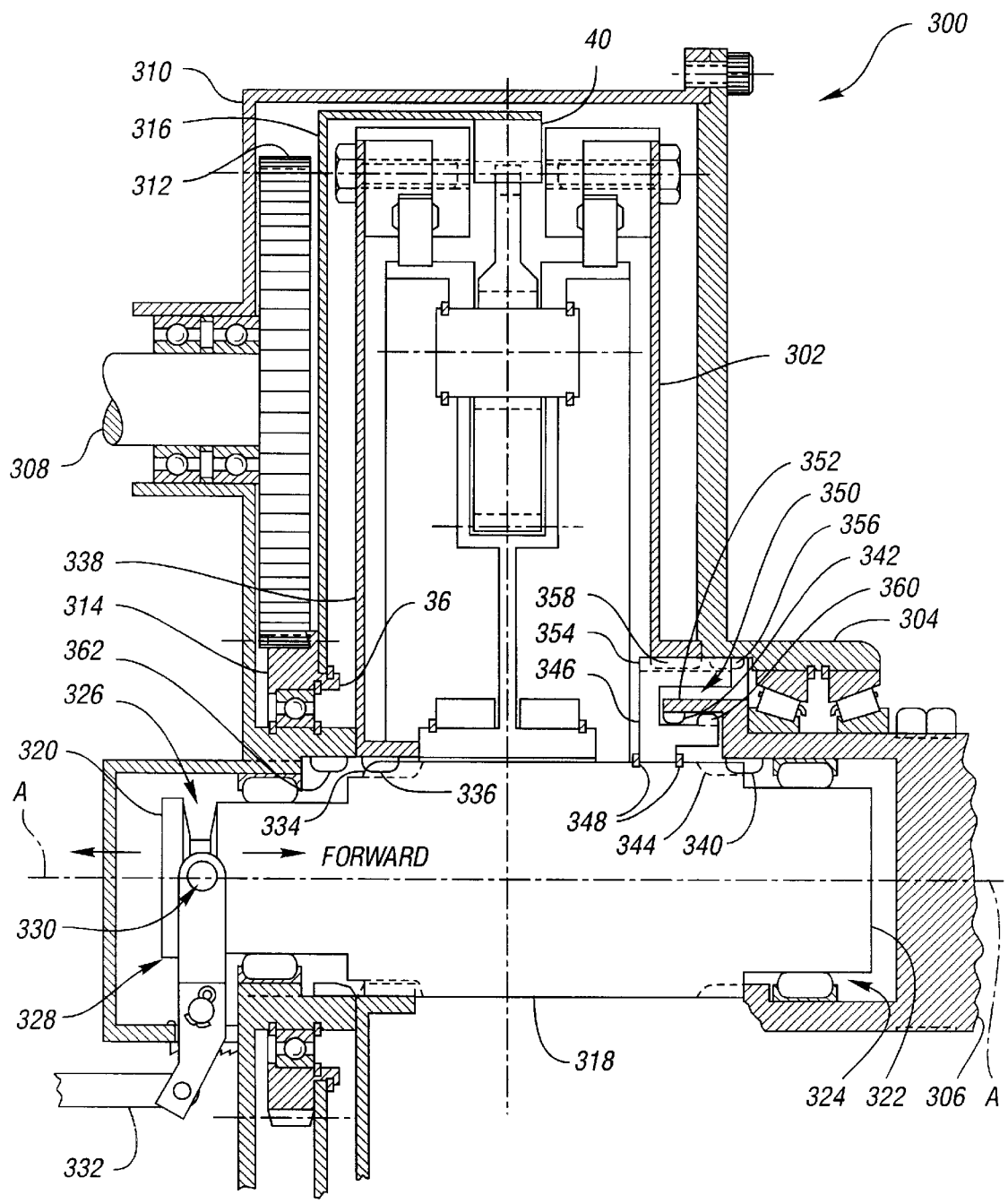
FIG. 19 is a view of a second preferred embodiment of the present invention, similar to that shown by FIG. 1, that includes provision for bidirectional and neutral operation.

For the inertial power transmission of the present invention to be more suitable for use as a vehicle transmission, it must have the capability of selectably driving its output shaft in a forward and a reverse direction and of not driving the output shaft at all. A second preferred embodiment featuring this capability is shown by FIG. 19 of the drawings. As shown, the inertial power transmission is in forward.

The second preferred embodiment, generally indicated by reference numeral 300 in FIG. 19, is similar to the first preferred embodiment of FIG. 1. Since the detailed description of those portions of this embodiment that are the same as those of the first preferred embodiment has already been included, it will not be repeated here.

The second preferred embodiment includes a mechanism to couple an input shaft 308 to an input member, or disk 316, using a first coupling means, which, in the second embodiment, for example, include an input gear 312 connected to rotate with the input shaft 308 and in turn to rotate a transfer gear 314 with which it is engaged, the transfer gear 314 being connected to the input disk 316 by a bolt 36. It should be understood by anyone skilled in the art that input gear 312 and transfer gear 314, although shown in FIG. 19 as being spur gears, could also be helical gears. Rotation of the input shaft 308 is thus transferred via the input disk 316 to the ring gear 40, which rotates about the central axis A.

An intermediate shaft 318 having a first end 320 and a second end 322 is journaled at its first end 320 within the housing 310. Its second end 322 is journaled within a longitudinal recess, generally indicated by reference numeral 324, in the output shaft 306 so that it can rotate and also have a limited amount of longitudinal freedom. It is the longitudinal displacement of the intermediate shaft 318 that effects the transmission shifts into or from forward, neutral or reverse.

An annular recess, generally indicated by reference numeral 326, is defined in the intermediate shaft 318 proximate the first end 320 thereof. A fork and slider mechanism, generally indicated by reference numeral 328, is medially and pivotably mounted on the housing 310. A slider portion (not shown in detail but generally indicated by reference numeral 330) is disposed proximate one end of the fork and slider mechanism 328 and resides within the annular recess 326, which serves as a guide for the slider 330. A shifting arm 332 is pivotably connected to the other end of the fork and slider mechanism 328 to facilitate remote operation of the inertial power transmission. As the fork and slider mechanism 328 is pivoted by the shifting arm 332, the slider portion 330 urges the intermediate shaft 318 in one selected longitudinal direction or another.

Figure 20A:
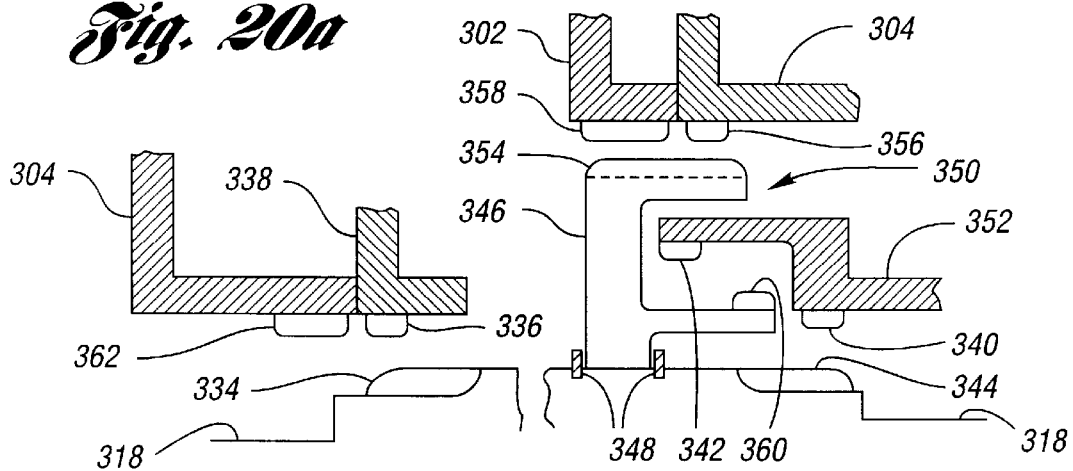
FIG. 20A is a view, partially broken away and partially in section, showing details of relevant gear interactions, the gears being shown separated so that the configurations and relative positions of their teeth can be more clearly observed, of a portion of the present invention when it is providing output torque in a forward direction.

The intermediate shaft 318 includes forward drive gear teeth 334 formed circumferentially therein to slidably engage forward drive disk gear teeth 336 disposed on a forward drive disk 338 when, as shown in FIGS. 19 and 20A, the intermediate shaft 318 is in its forward (right-most) position. (Note that, in FIG. 20A, the gears are shown separated so that the configurations and relative positions of their teeth can be more clearly observed.) The output shaft 306 has a stepped end, the longitudinal recess 324 therein also being stepped accordingly. The stepped portion of the output shaft 306 and the stepped portion of the recess 324 therein define therebetween a hollow cylinder 352 having an outside diameter greater than that of the nonstepped portion of the output shaft 306.

Output shaft forward drive gear teeth 340 are disposed proximate the opening of the smallest portion of the stepped, longitudinal recess 324 and extend radially inwardly therefrom. Output shaft reverse drive gear teeth 342 are disposed proximate the opening of the hollow cylinder 352 and extend radially inwardly therefrom. The intermediate shaft 318 also includes output drive gear teeth 344 formed circumferentially therein to engage the output shaft forward drive gear teeth 340 when the intermediate shaft 318 is in its forward position. The intermediate shaft 318 thus forms, in the second preferred embodiment, a third coupling means, which communicates rotation of the forward drive member 338 to the output shaft 306.

A collar 346 is rotatably disposed about the output shaft 306 for rotation about the central axis A. A pair of snap rings 348 set in annular grooves in the output shaft 306 maintain the longitudinal position of the collar 346. The collar 346 has an annular recess, generally indicated by reference numeral 350, in one of its sides to rotatably receive a portion of the hollow cylinder 352. As seen in FIG. 19 and in detail in FIG. 20A, collar stationary gear teeth 354 are disposed on the circumferential face of the collar 346 to engage, when the intermediate shaft 318 is in its forward. position, forward stationary support gear teeth 356 disposed on the stationary support 304.

The collar stationary gear teeth 354 also engage stationary disk gear teeth 358 disposed on the stationary, or reaction, disk 302, and they do so regardless of the intermediate shaft position. When the intermediate shaft 318 is in its forward position, the stationary disk 302 is connected to the stationary support 304 through the collar stationary gear teeth 354 and is thus prevented from rotating. The collar stationary gear 346 thus forms, in the second preferred embodiment, a second coupling means, which connects and disconnects the stationary disk 302 to and from the stationary support 304. With the intermediate shaft 318 in its forward position and the various gear teeth engaged as described, rotation of the forward drive disk 338 is communicated through the intermediate shaft 318 to the output shaft 306, which rotates in the same direction.

Figure 20B:
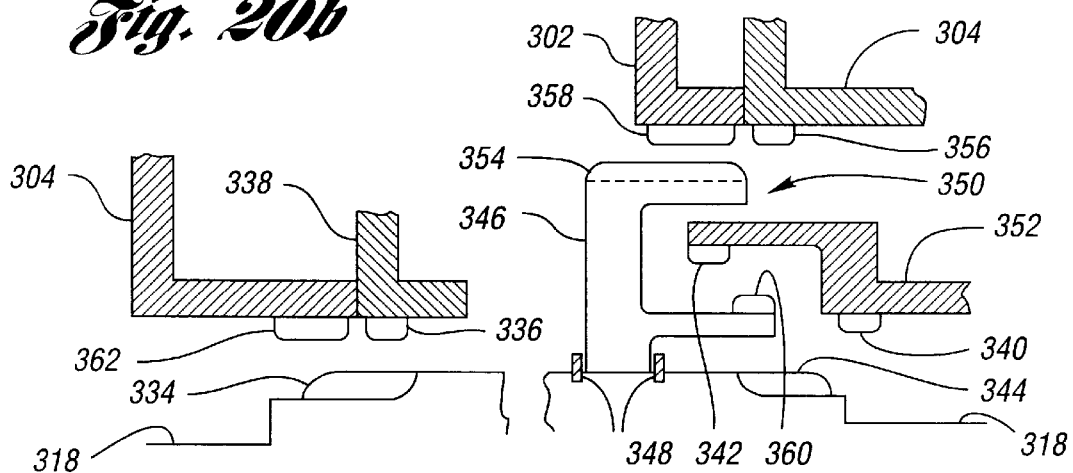
FIG. 20B is the view of FIG. 20A but showing details of relevant gear interactions, the gears being shown separated so that the configurations and relative positions of their teeth can be more clearly observed, of a portion of the present invention when it is providing no output torque.

As shown in detail in FIG. 20B, when the intermediate shaft 318 is displaced (leftwardly) to its central, or neutral, position, the forward drive gear teeth 334 disposed on the intermediate shaft 318 engage the reverse stationary support gear teeth 362 disposed on the stationary support 304. (Note that, in FIG. 20B, the gears are shown separated so that the configurations and relative positions of their teeth can be more clearly observed.) This prevents the forward drive disk 338 and the intermediate shaft 318 from rotating. Also, the output drive gear teeth 344 disposed on the intermediate shaft 318 disengage from the output shaft forward drive gear teeth 340 disposed on the output shaft 306. The collar stationary gear teeth 354 disposed on the collar 346 also disengage from the forward stationary support gear teeth 356 disposed on the stationary support. When the intermediate shaft 318 is in this position, no drive is applied to it; and it communicates no drive to the output shaft 306.

Figure 20C:
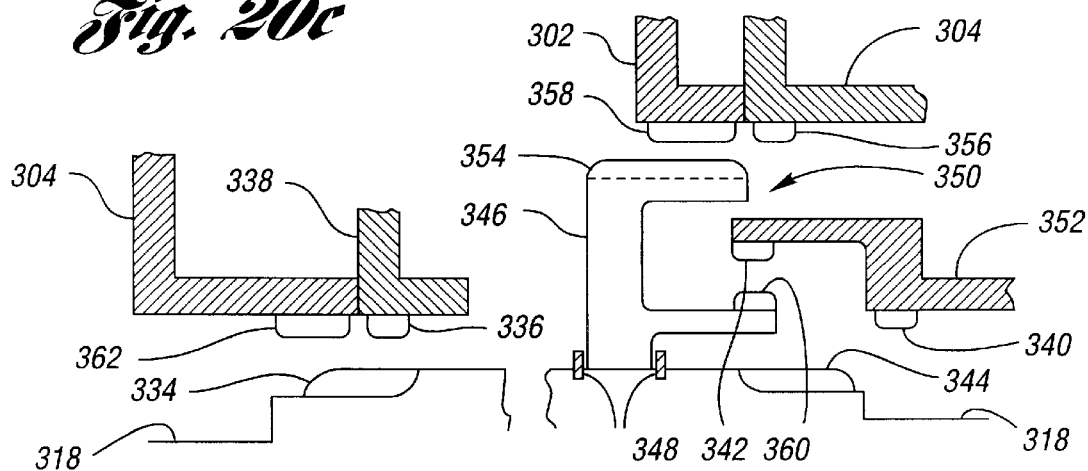
FIG. 20C is the view of FIG. 20A but showing details of relevant gear interactions, the gears being shown separated so that the configurations and relative positions of their teeth can be more clearly observed, of a portion of the present invention when it is providing output torque in a reverse direction.

As shown in detail in FIG. 20C, when the intermediate shaft 318 is displaced to its left-most, or reverse, position, the forward drive gear teeth 334 disposed on the intermediate shaft 318 maintain their engagement with the reverse stationary support gear teeth 362 disposed on the stationary support 304 and with the forward drive disk gear teeth 336 disposed on the forward drive disk 338. (Note that, in FIG. 20C, the gears are shown separated so that the configurations and relative positions of their teeth can be more clearly observed.) This prevents the forward drive disk 338 and the intermediate shaft 318 from rotating. Collar reverse drive gear teeth 360 are disposed within the annular recess 350 in the collar 346, and these engage the output shaft reverse drive gear teeth 342. With the intermediate shaft 318 in its reverse position and the various gear teeth engaged as described, rotation of the stationary disk 302 is communicated through the collar 346 to the output shaft 306, which rotates in a direction opposite to that which the forward drive disk 338 had before the shift, but which is now stationary.

While the best mode for carrying out the invention has been described in detail, those familiar with the art to which this invention relates will recognize various alternative designs and embodiments for practicing the invention as defined by the following claims.

What is claimed is:
1. An inertial power transmission apparatus, comprising:
a stationary support;
an input shaft rotatably mounted on the stationary support and having a longitudinal axis of rotation;
an output shaft rotatably mounted on the stationary support and having a longitudinal axis of rotation coincident with a central axis;
an input member disposed in a plane perpendicular to the central axis for rotation thereabout;
first coupling means for communicating rotation of the input shaft to the input member;
a ring gear disposed in a plane parallel to and spaced from that of the input member and being affixed thereto for rotation therewith about the central axis;
a stationary member disposed in a plane parallel to and spaced from that of the input member;
second coupling means for coupling the stationary member to the stationary support;
a forward drive member disposed in a plane parallel to and spaced from that of the input member for rotation about the central axis;
third coupling means for communicating rotation of the forward drive member to the output shaft;
a plurality of planet gear carriers each extending diametrically across the ring gear for rotation in a carrier plane about the central axis, adjacent planet gear carriers defining substantially equal angles therebetween;
one of a plurality of planet gear shafts mounted proximate a separate end of each of the plurality of planet gear carriers, each planet gear shaft having a longitudinal axis of rotation mutually parallel to and spaced from the central axis;
one of a plurality of planet gears mounted on each of the planet gear shafts for rotation thereabout and for engagement with the ring gear, the mass of each of the two planet gears supported by any planet gear carrier being eccentrically distributed so that the rotational moment of each of the two planet gears is equal and opposite to that of the other, the eccentric distribution of the masses of the planet gears supported by a planet gear carrier being disposed such that the peaks of resultant rotational moments contributed by the planet gear carriers are separated by substantially equal time intervals;
a stationary ring assembly affixed to the stationary member and having an axis of symmetry coincident with the central axis;
a drive ring assembly affixed to the forward drive member for rotation therewith about the central axis;
a stationary ring clutch disposed in cooperation with each end of each of the planet gear carriers and the stationary ring assembly to allow the former to rotate relative to the latter in only a first direction; and
a drive ring clutch disposed in cooperation with the drive ring assembly and each end of each of the planet gear carriers to allow the former to rotate relative to the latter in only the same first direction.
2. The inertial power transmission apparatus as defined by claim 1, wherein the first, second and third coupling means include rigid fasteners.
3. The inertial power transmission apparatus as defined by claim 1, wherein the drive ring assembly and the stationary ring assembly each have an internal annular slot having lateral sides formed therein and each have a central plane between the lateral sides and perpendicular to the central axis, the drive ring assembly and the stationary ring assembly each including:

a first ring; and a second ring generally laterally affixed to the first ring, each of the lateral sides of the internal annular slot having an annular recess formed therein, each annular recess having canted surfaces that mutually converge as a linear function of annular recess depth.

4. The inertial power transmission apparatus as defined by claim 3, wherein each of the stationary ring and drive ring clutches comprises:

at least one primary wedge disposed on a planet gear carrier for revolution therewith about the central axis, the at least one primary wedge having a central longitudinal plane and lateral sides equally and linearly angled relative thereto; and a pair of secondary wedges, each being slidably disposed on a mutually opposite lateral side of the at least one primary wedge for revolution therewith, in the first direction, along the annular recesses in the lateral sides of an internal annular slot, each secondary wedge having an inner and an outer lateral side, each inner lateral side being parallel to an adjacent angled side of the at least one primary wedge and each outer lateral side being parallel to the central longitudinal plane of the at least one primary wedge and having edges beveled at angles equal to the angles of convergence of adjacent canted surfaces of an annular recess, the at least one primary wedge forcing secondary wedges apart to lock a clutch when relative motion between the at least one primary wedge and a ring assembly is in one direction and allowing secondary wedges to approach each other to unlock a clutch when the relative motion is in the opposite direction.

5. The inertial power transmission apparatus as defined by claim 3, further including a pair of resilient members, each biasing a different one of the pair of secondary wedges in a direction along the central longitudinal plane of the at least one primary wedge and away from the primary wedge.

6. The inertial power transmission apparatus as defined by claim 2, wherein each of the plurality of planet gear carriers includes a central assembly and a peripheral assembly, the central assembly including:

a right circular cylindrical portion longitudinally extending along the central axis; and a pair of centrally disposed carrier arms extending oppositely therefrom at right angles to the central axis.

7. The inertial power transmission apparatus as defined by claim 3, wherein each of the stationary ring and drive ring clutches comprises:

at least one primary wedge disposed on a planet gear carrier for revolution therewith about the central axis, the at least primary wedge having a central longitudinal plane and lateral sides equally and linearly angled relative thereto; and a pair of balls, each being slidably disposed on a mutually opposite lateral side of the at least one primary wedge for revolution therewith, in the first direction, along the annular recesses in the lateral sides of an internal annular slot, the at least one primary wedge forcing the pair of balls apart to lock a clutch when relative motion between the at least one primary wedge and a ring assembly is in one direction and allowing the pair balls to approach each other to unlock a clutch when the relative motion is in the opposite direction.

8. The inertial power transmission apparatus as defined by claim 3, wherein each of the stationary ring and drive ring clutches comprises:

at least one primary wedge disposed on a planet gear carrier for revolution therewith about the central axis, the at least one primary wedge having a central longitudinal plane and lateral sides equally and linearly angled relative thereto; and a pair of hemispherically ended rollers, each being slidably disposed on a mutually opposite lateral side of the at least one primary wedge for revolution therewith, in the first direction, along the annular recesses in the lateral sides of an internal annular slot, the at least one primary wedge forcing the pair of hemispherically ended rollers apart to lock a clutch when relative motion between the at least one primary wedge and a ring assembly is in one direction and allowing the pair of hemispherically ended rollers to approach each other to unlock a clutch when the relative motion is in the opposite direction.

9. The inertial power transmission apparatus as defined by claim 1, wherein the drive ring assembly and the stationary ring assembly each have an internal annular slot having lateral sides formed therein and each have a central plane between the lateral sides and perpendicular to the central axis, the drive ring assembly and the stationary ring assembly each including:

a first ring; and a second ring generally laterally affixed to the first ring, each of the lateral sides of the internal annular slot having an annular recess formed therein, each annular recess having sectionally curved surfaces, and wherein each of the stationary ring and drive ring clutches comprises:

at least one primary wedge disposed on a planet gear carrier for revolution therewith about the central axis, the at least one primary wedge having a central longitudinal plane and lateral sides equally and linearly angled relative thereto; and a pair of balls, each being slidably disposed on a mutually opposite lateral side of the at least one primary wedge for revolution therewith, in the first direction, along the annular recesses in the lateral sides of an internal annular slot, each of the sectionally curved surfaces having a radius of curvature substantially equal to those of the balls, the at least one primary wedge forcing the pair of balls apart to lock a clutch when relative motion between the at least one primary wedge and a ring assembly is in one direction and allowing the pair balls to approach each other to unlock a clutch when the relative motion is in the opposite direction.

10. The inertial power transmission apparatus as defined by claim 3, wherein each of the stationary ring and drive ring clutches comprises:

at least one primary wedge disposed on a planet gear carrier for revolution therewith about the central axis, the least one primary wedge having a central longitudinal plane and lateral sides equally and linearly angled relative thereto; and a pair of chamfer-ended rollers, each being slidably disposed on a mutually opposite lateral side of the at least one primary wedge for revolution therewith, in the first direction, along the annular recesses in the lateral sides of an internal annular slot, the at least one primary wedge forcing the pair of chamfer-ended rollers apart to lock a clutch when relative motion between the at least one primary wedge and a ring assembly is in one direction and allowing the pair of chamfer-ended rollers to approach each other to unlock a clutch when the relative motion is in the opposite direction.

11. The inertial power transmission apparatus as defined by claim 1, wherein the drive ring assembly and the stationary ring assembly each have an internal annular slot having lateral sides formed therein and each have a central plane between the lateral sides and perpendicular to the central axis, the drive ring assembly and the stationary ring assembly each including:

a first ring; and a second ring generally laterally affixed to the first ring, each of the lateral sides of the internal annular slot having an annular recess formed therein, the inertial power transmission apparatus further including:

a stationary ring primary wedge carrier rotatably disposed on each planet gear shaft proximate a first end thereof;

a drive ring primary wedge carrier rotatably disposed on each planet gear shaft proximate a second end thereof; and at least one primary wedge disposed on each stationary and drive ring primary wedge carrier for revolution therewith about the central axis, the at least one primary wedge having a central longitudinal plane and lateral sides equally and linearly angled relative thereto, a projected line of convergence of the lateral sides of the at least one primary wedge disposed on each stationary ring primary wedge carrier being in the opposite direction from a projected line of convergence of the lateral sides of the at least one primary wedge disposed on each drive ring primary wedge carrier.

* * * * *